United States Patent [19]

Vijuk

[11] Patent Number: 5,044,873

[45] Date of Patent: Sep. 3, 1991

[54] APPARATUS FOR STACKING FOLDED SHEETS ON EDGE

[76] Inventor: Michael Vijuk, 7 Tower Rd., Oakbrook, Ill. 60512

[21] Appl. No.: 319,953

[22] Filed: Mar. 7, 1989

Related U.S. Application Data

[62] Division of Ser. No. 940,890, Dec. 12, 1987, Pat. No. 4,812,195.

[51] Int. Cl.[5] .............................................. B65G 57/22

[52] U.S. Cl. ................................ 414/792.5; 271/198; 271/207; 53/542

[58] Field of Search ............... 271/184, 190, 198, 207, 271/210, 221, 224, 213; 198/456, 457; 414/789.9, 790.8, 791.5, 792.5; 53/542

[56] References Cited

U.S. PATENT DOCUMENTS

| | | | |
|---|---|---|---|
| 3,052,466 | 9/1962 | Prince et al. | 271/207 |
| 3,148,879 | 9/1964 | Kistner | 271/224 |
| 3,378,258 | 4/1968 | Leuhrs | 271/210 |
| 3,483,817 | 12/1969 | Stobb | 271/207 |
| 3,672,118 | 6/1972 | DeJong et al. | 414/790.8 |
| 3,825,134 | 7/1974 | Stobb | 414/789.9 |
| 4,034,845 | 7/1977 | Honegger | 271/207 |
| 4,051,957 | 10/1977 | Parups | 271/184 |
| 4,161,095 | 7/1979 | Buday | 53/542 |
| 4,676,050 | 6/1987 | Odenthal | 53/542 |
| 4,835,947 | 6/1989 | Langen et al. | 53/542 |
| 4,844,438 | 7/1989 | Mistyurik et al. | 271/224 |
| 4,873,813 | 10/1989 | Labombarde et al. | 53/542 |
| 4,879,862 | 11/1989 | Nolte et al. | 53/542 |

FOREIGN PATENT DOCUMENTS

| | | | |
|---|---|---|---|
| 2573736 | 5/1986 | France | 53/542 |
| 225412 | 7/1985 | German Democratic Rep. | 271/207 |
| 149264 | 8/1984 | Japan | 271/207 |

*Primary Examiner*—Robert P. Olszewski
*Assistant Examiner*—Steve Reiss
*Attorney, Agent, or Firm*—Marvin N. Benn; Milton S. Gerstein; Thomas B. Lindgren

[57] ABSTRACT

Apparatus is disclosed for folding sheets and for slitting the folded sheets to form adjacent parallel rows or streams of folded sheets being conveyed by belts into a stacking station. A jogger located adjacent the conveyor belts may jog folded sheets laterally to indicate a predetermined count of sheets in a column. The folded sheets in each column are fed by the belts upward against stops. A generally horizontal support holds a container to receive parallel streams of on-edge vertical folded sheets each of which is pushed into the container while on-edge and vertical by a succeeding folded sheet. The container is removed having parallel rows of on-edge, vertically positioned, folded sheets stacked therein.

3 Claims, 28 Drawing Sheets

28
69
28a
28b
74
75
70
29
73
29a
72
64
64a
20

65a
64
67
68
30

FIG. 31
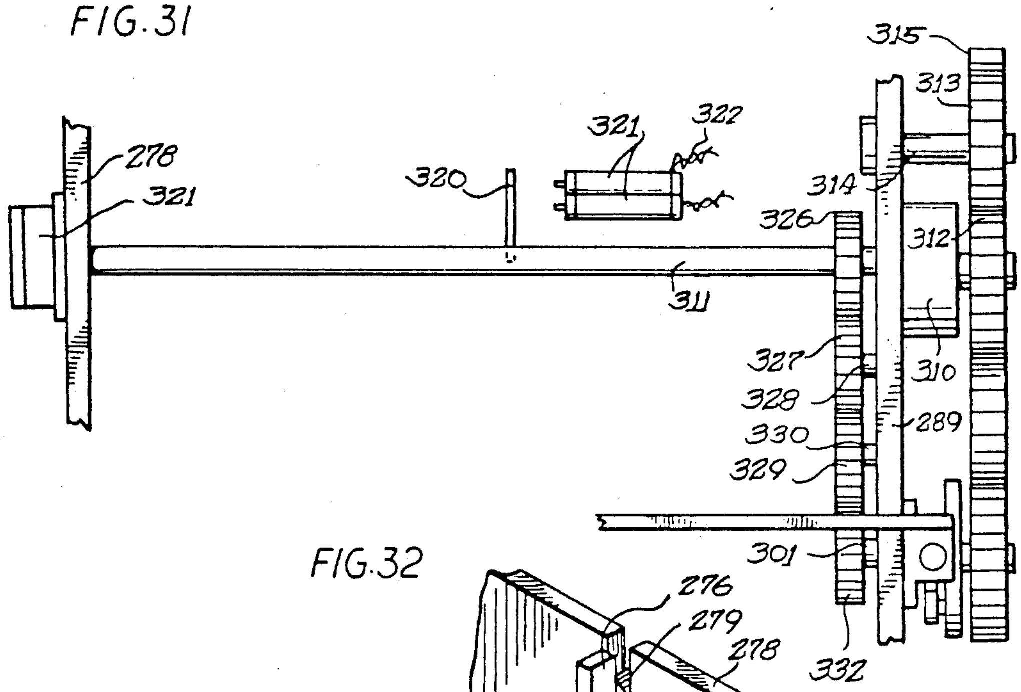
FIG. 32
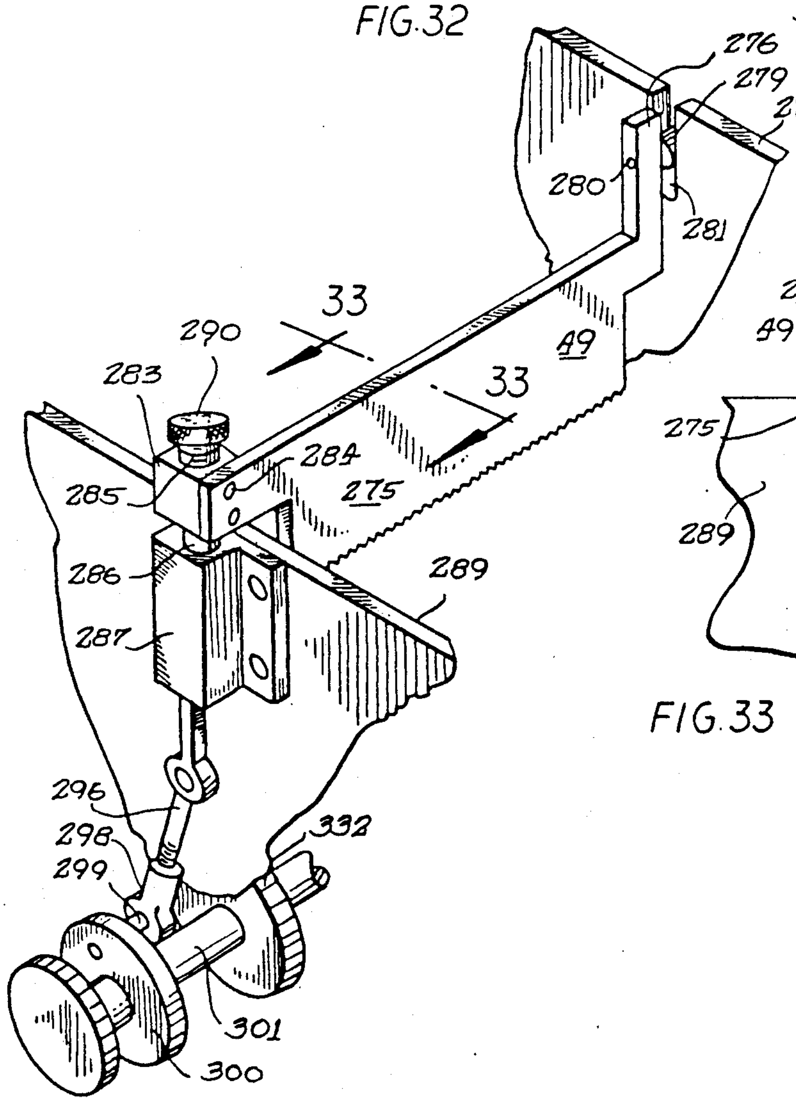
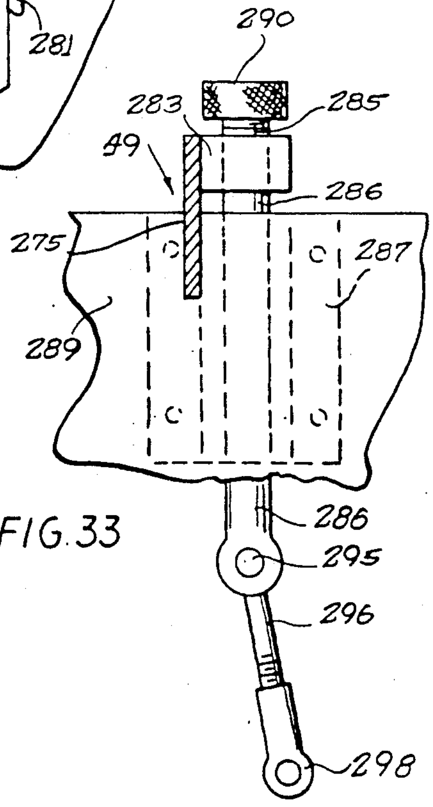
FIG. 33

FIG.41
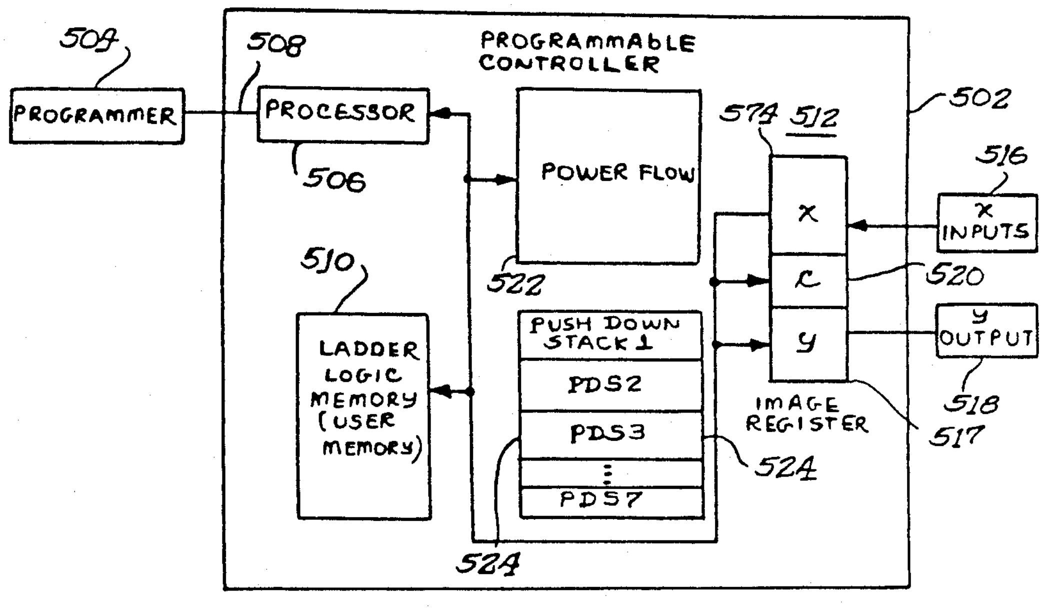
FIG. 42 A-E
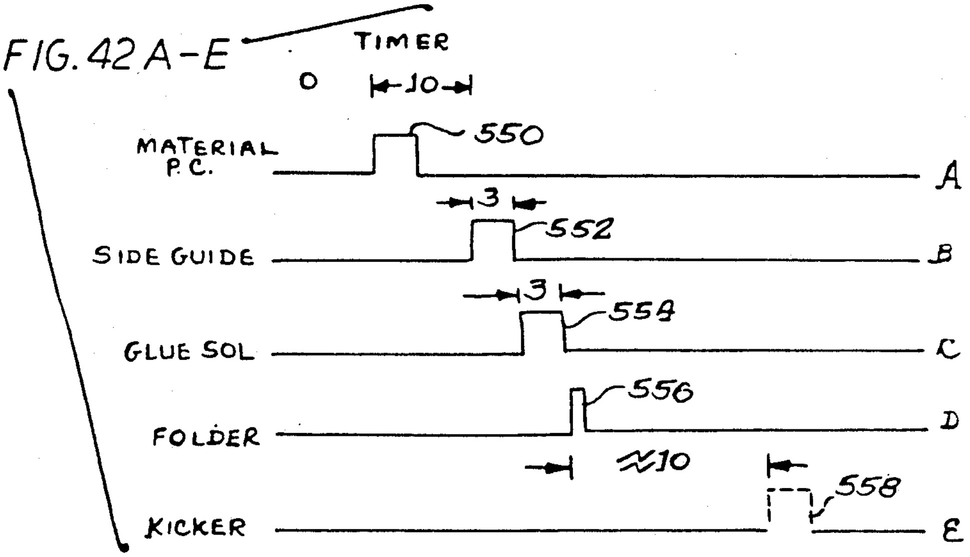
FIG. 43 A-C
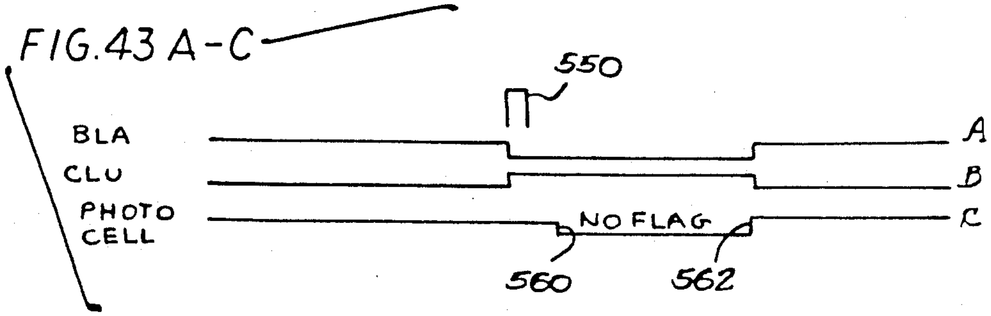

APPARATUS FOR STACKING FOLDED SHEETS ON EDGE

This is a division, of application Ser. No. 940,890, filed Dec. 12, 1987, now U.S. Pat. No. 4,812,195.

This invention relates to a method and apparatus for folding sheets, and more particularly, to folding sheets and adhering an outer fold to the inner fold to make "outserts" which bear information relating to the pharmaceuticals and which are inserted into the pharmaceutical packages to give instructions and warnings to the users of the pharmaceutical.

BACKGROUND OF THE INVENTION

The present invention is directed to a new and improved method and apparatus for making folded sheets such as outserts which are often very long, for instance, 9 inches to 50 inches in length and which are folded a number of times with the outermost fold of the outsert being glued tight to an inner fold to make a tight folded packet called an outsert. Currently, outsert machines require a plurality of operators to run the machine which adds significantly to the cost of the individual outsert and the machines are limited in the amount of production of outserts per hour. The present invention is directed to providing increased speeds of operation up to, for example, 10,000 sheets per hour or more and to providing a machine at such production which may be run by one operator.

The usual higher production machines currently available prior to this invention are sheet machines which use pre-cut sheets and which operate at much slower rates, for example, 1500 to 2500 outserts per hour. Also, these pre-cut sheet machines may have a problem from a security standpoint in that the preprinted sheets can be mixed either deliberately, or inadvertently such that the wrong outsert may be inserted into the wrong package. As will be explained, the present invention also may be used to fold pre-cut sheets and to form outserts therefrom but the preferred embodiment of the invention has a roll of outserts preprinted on a web which is unwound and cut into sheets prior to the folding and gluing of the wrap-around fold to the inner fold.

The present invention is also directed to providing increased security and reliability of matching of the outserts to the medicine by having the equipment provided with "readers" which read indicia on the webs and which are programmed to fold outserts only when the proper indicia or locations of indicia appear on the web which is for the pharmaceutical to which the outsert is to be inserted.

Also another aspect of the invention is the automatic boxing of the outserts, which may be coming off the equipment at rates of 42,000 outserts per hour into boxes without requiring a separate operator to box the outserts at the discharge end of the apparatus.

Another aspect of the present invention is that of improved folding and glueing units, which are controlled by a microprocessor to provide greater precision control of the sheets for folding and slitting and for stacking.

Accordingly, an object of the present invention is to provide a new and improved method and apparatus for folding sheets such as outserts.

These and other objects and advantages of the invention will become apparent from the following detailed description taken into connection with the accompanying drawings:

FIG. **26*a*** is an elevational view of the folding rollers and slitting rollers.

FIG. **26*b*** is a view of the folding and slitting unit.

FIG. **26*c*** is a view illustrating the side jogger jogging a folding sheet.

Figure 26:
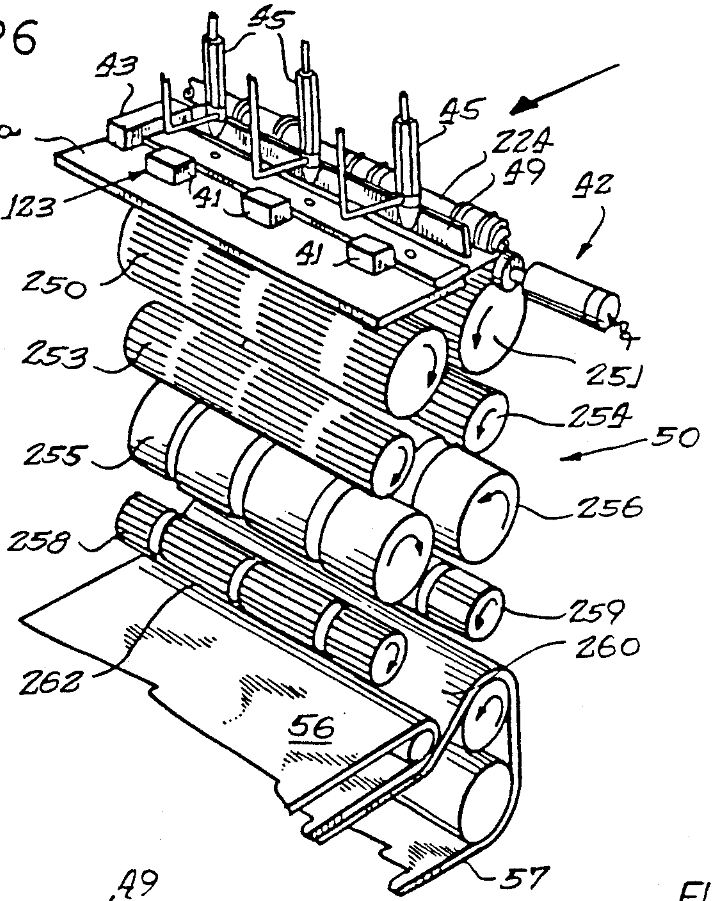
FIG. 26 is a diagramatic perspective view of the folding of the outsert.
Figure 27:
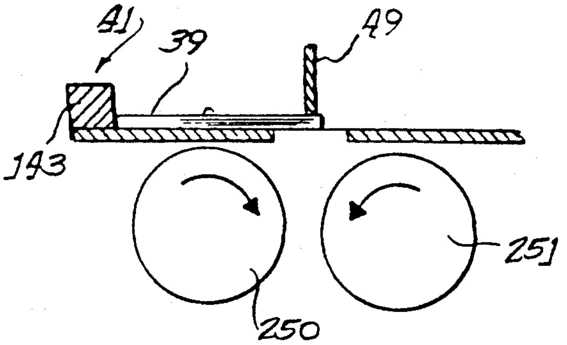
Figure 26A:
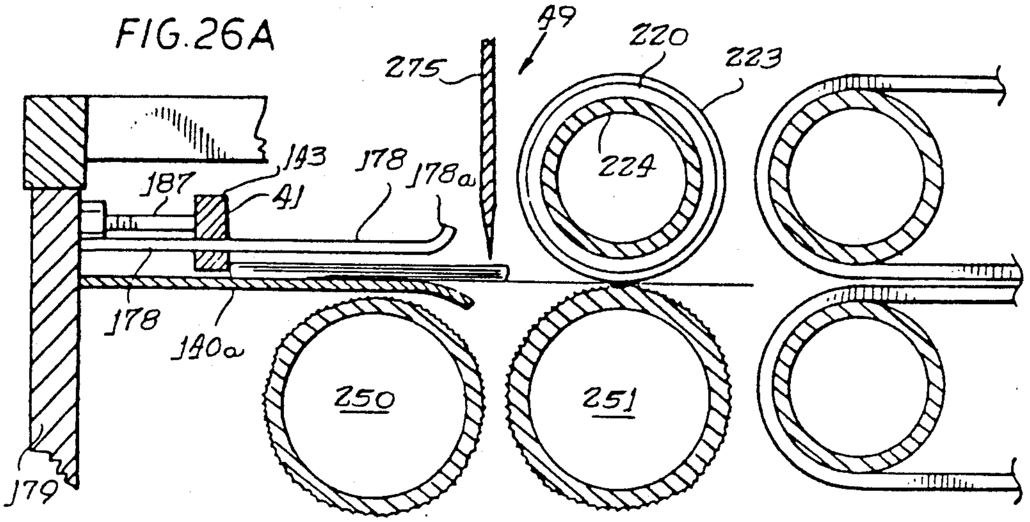
Figure 26B:
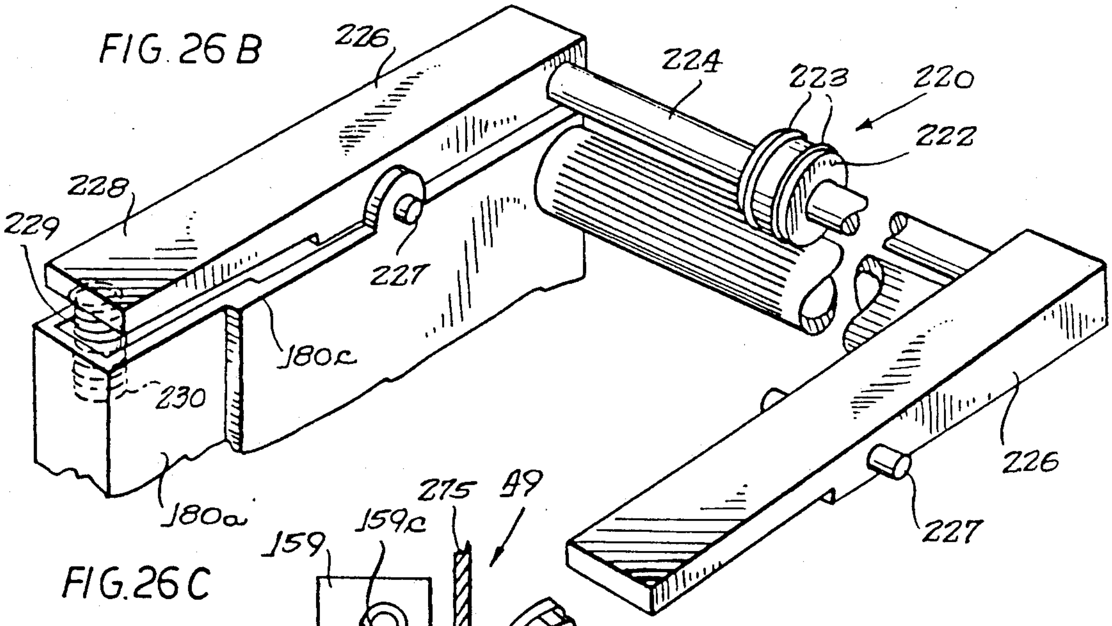
Figure 26C:
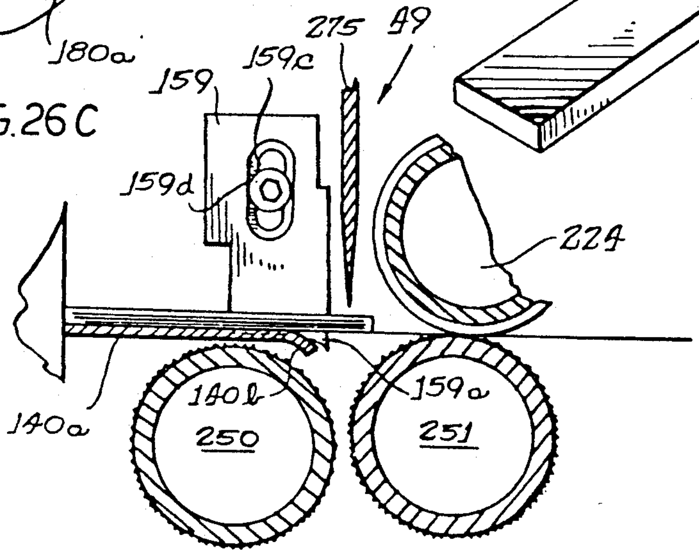
Figures 26D, 26E:
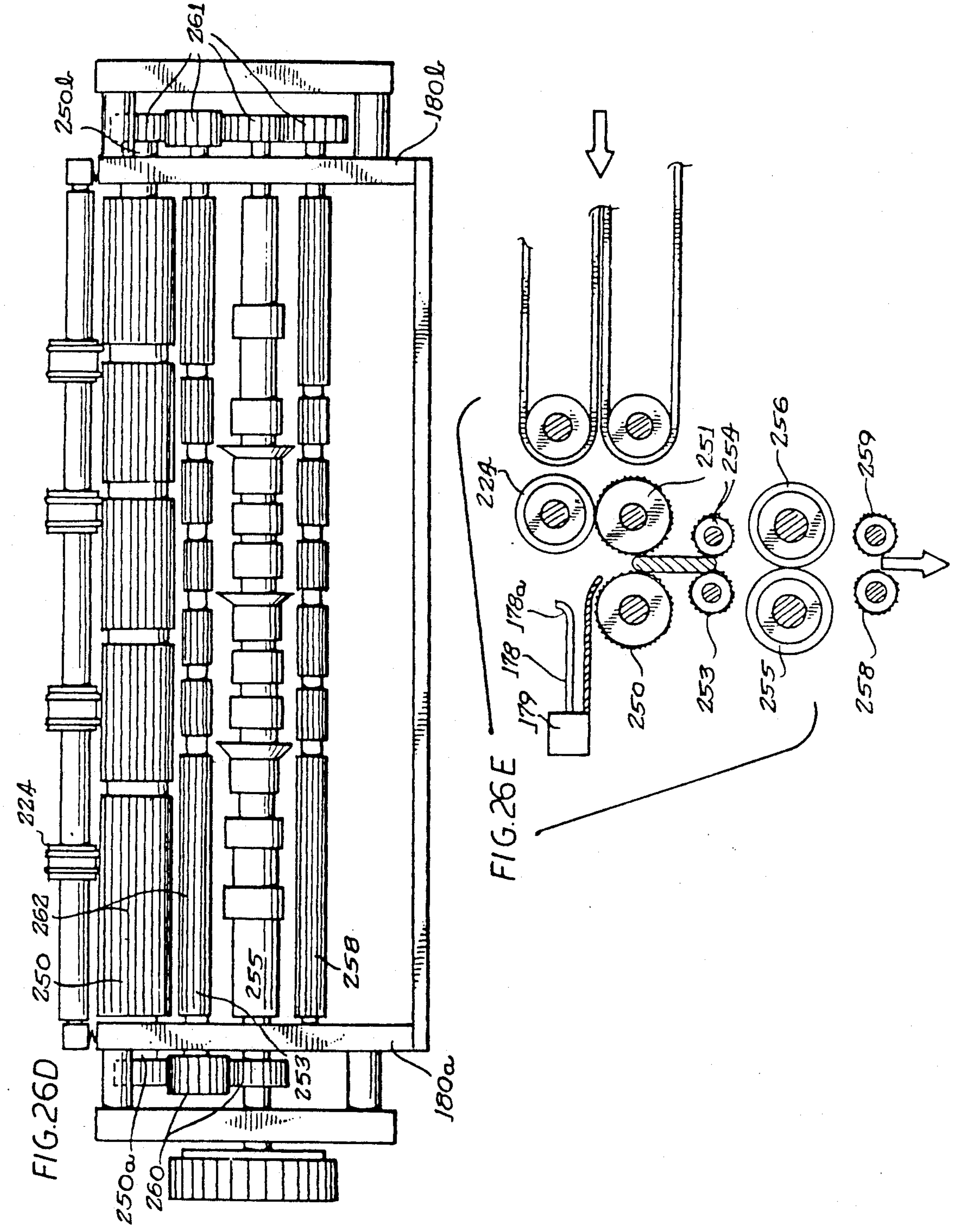

FIG. 26D is a side elevational view of the folding and slitting unit;

FIG. 26E is a diagrammatic view of the folding and slitting unit;

FIG. 27 is a view illustrating the folding rollers.

Figure 27A:
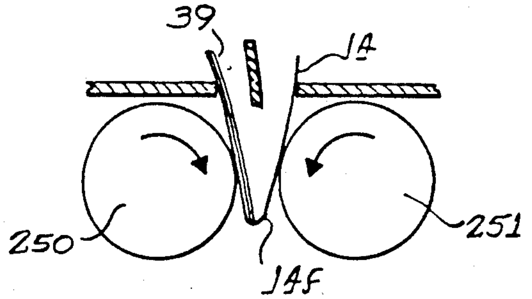

FIG. 27*a* illustrates the folding of the sheet by the rollers.

Figure 28:
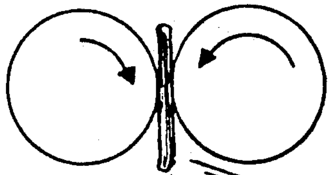

FIG. 28 illustrates adhering of the wrap-around section to the inner fold to form the outsert.

Figure 29:
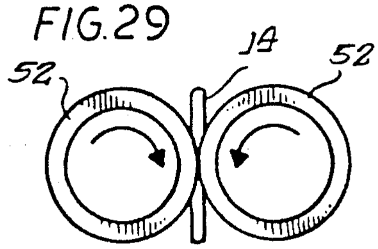

FIG. 29 illustrates a slitting of the outsert by a pair of slitting rollers.

Figure 30:
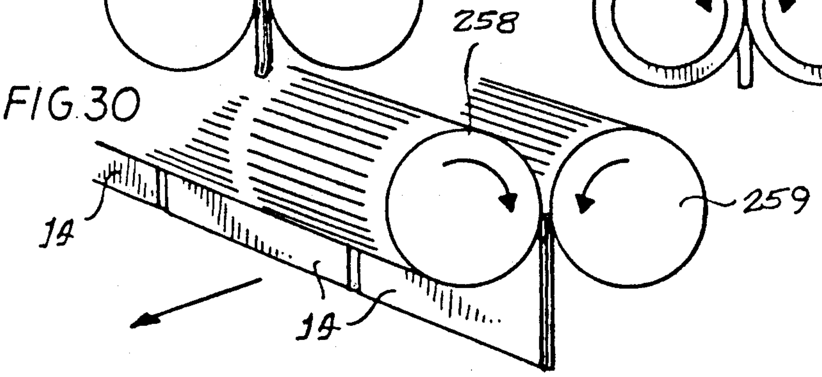

FIG. 30 illustrates a discharge of a slit outsert from a pair of transfer rollers.

FIG. 31 is an elevational view illustrating a drive for the folding knife.

FIG. 32 is a perspective view of a crank drive for a folding knife.

FIG. 33 is a view taken substantially long the line 33—33 of FIG. 32.

Figure 34:
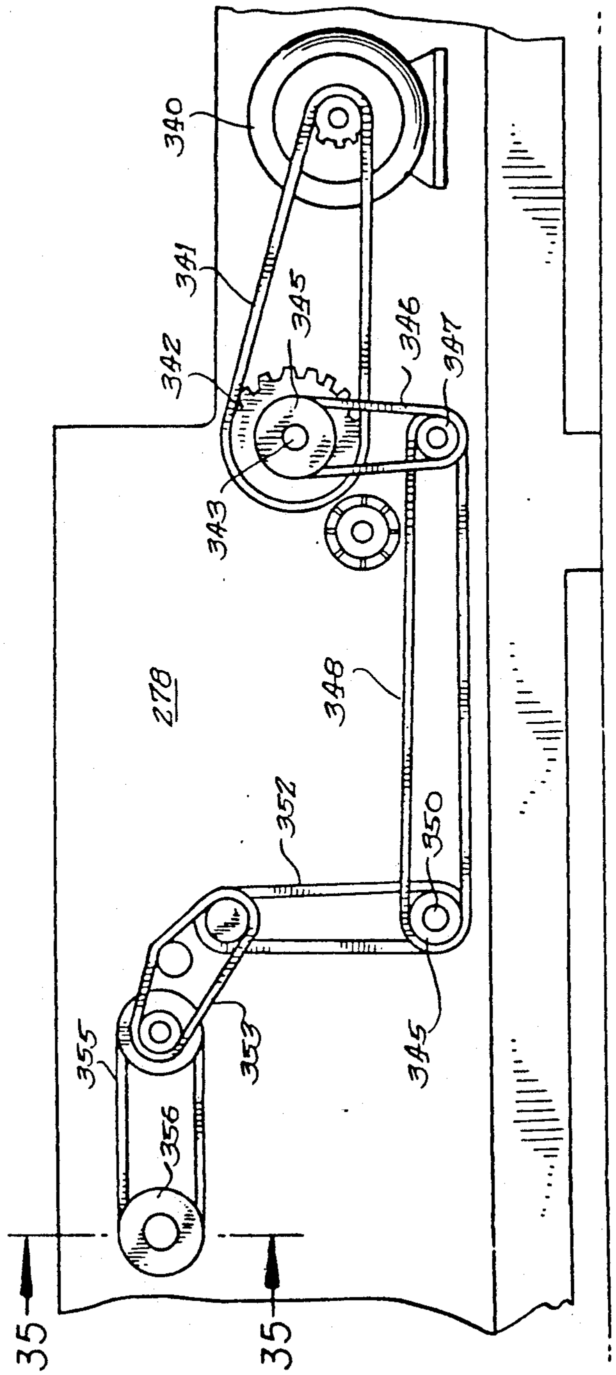

FIG. 34 is a side elevation of the folding knife drive.

Figure 35:
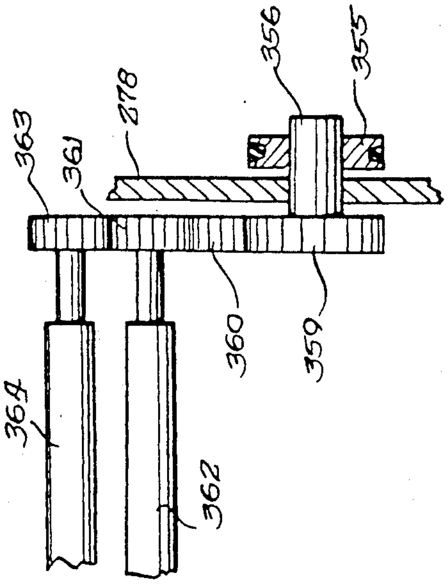

FIG. 35 is a cross-sectional view taken substantially along the line 35—35 of FIG. 34.

Figure 36:
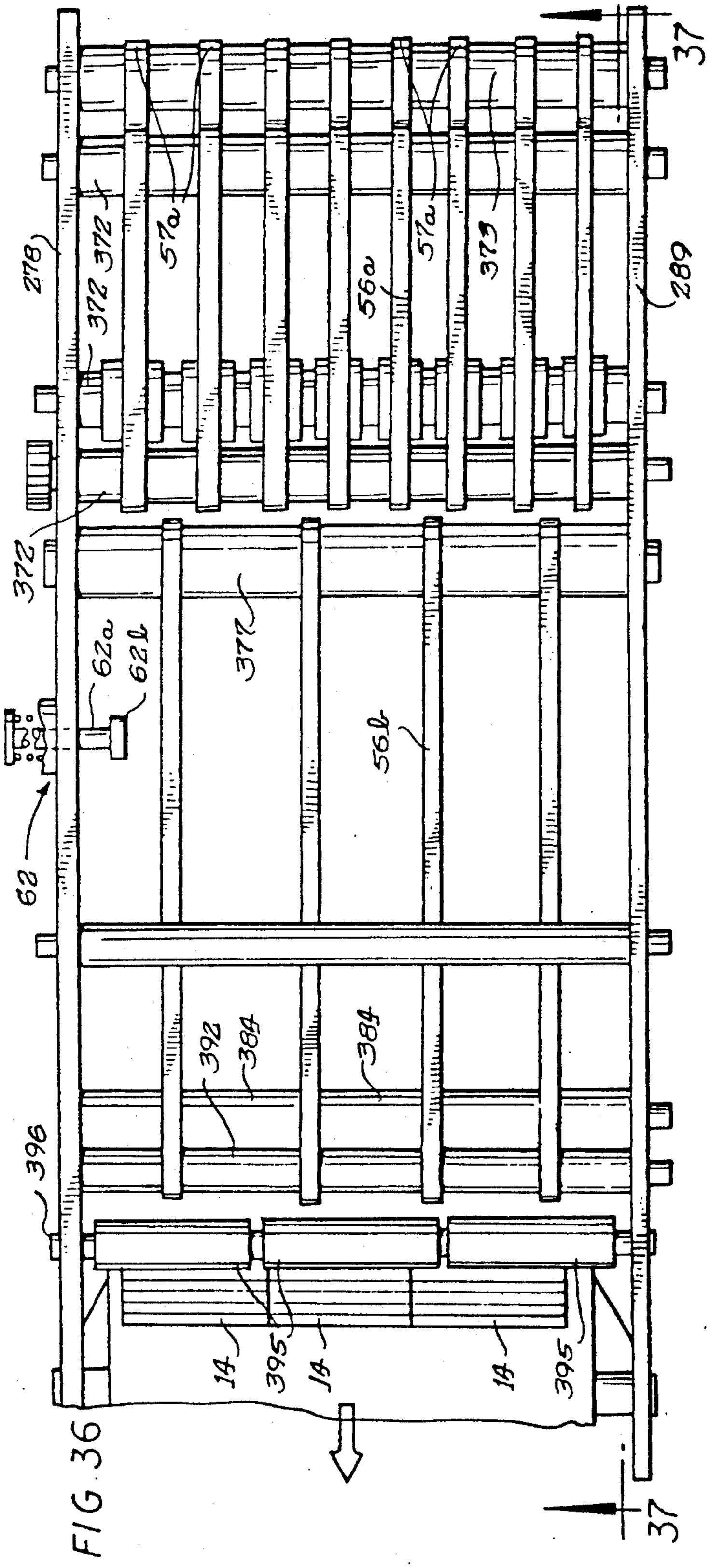

FIG. 36 is a plan view of a stacking means for the outserts.

Figure 37:
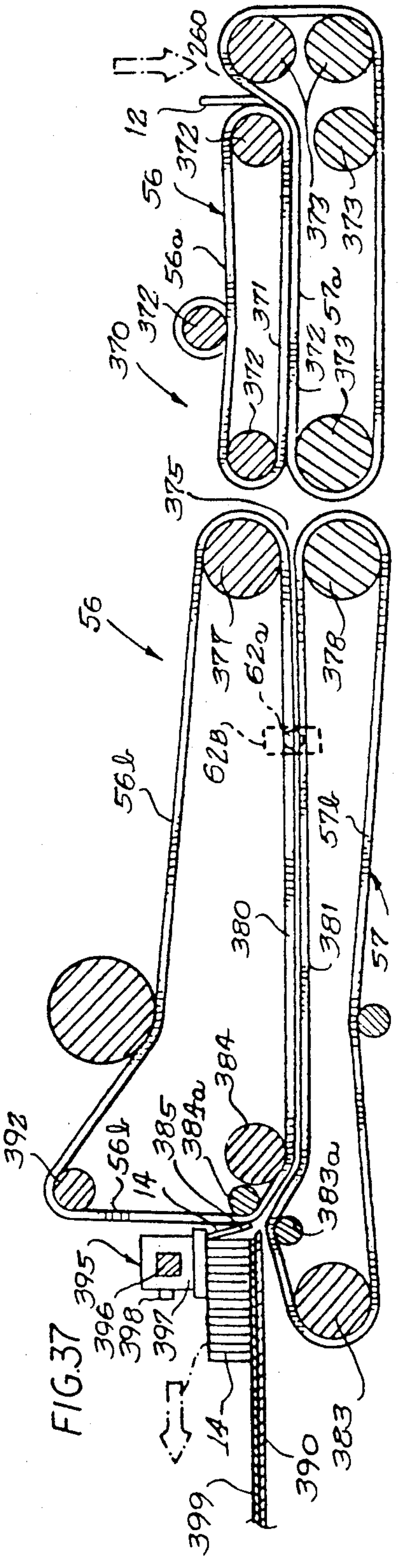

FIG. 37 is a sectional view taken substantially along the line 37—37 of FIG. 36.

Figures 1, 2, 3, 4:
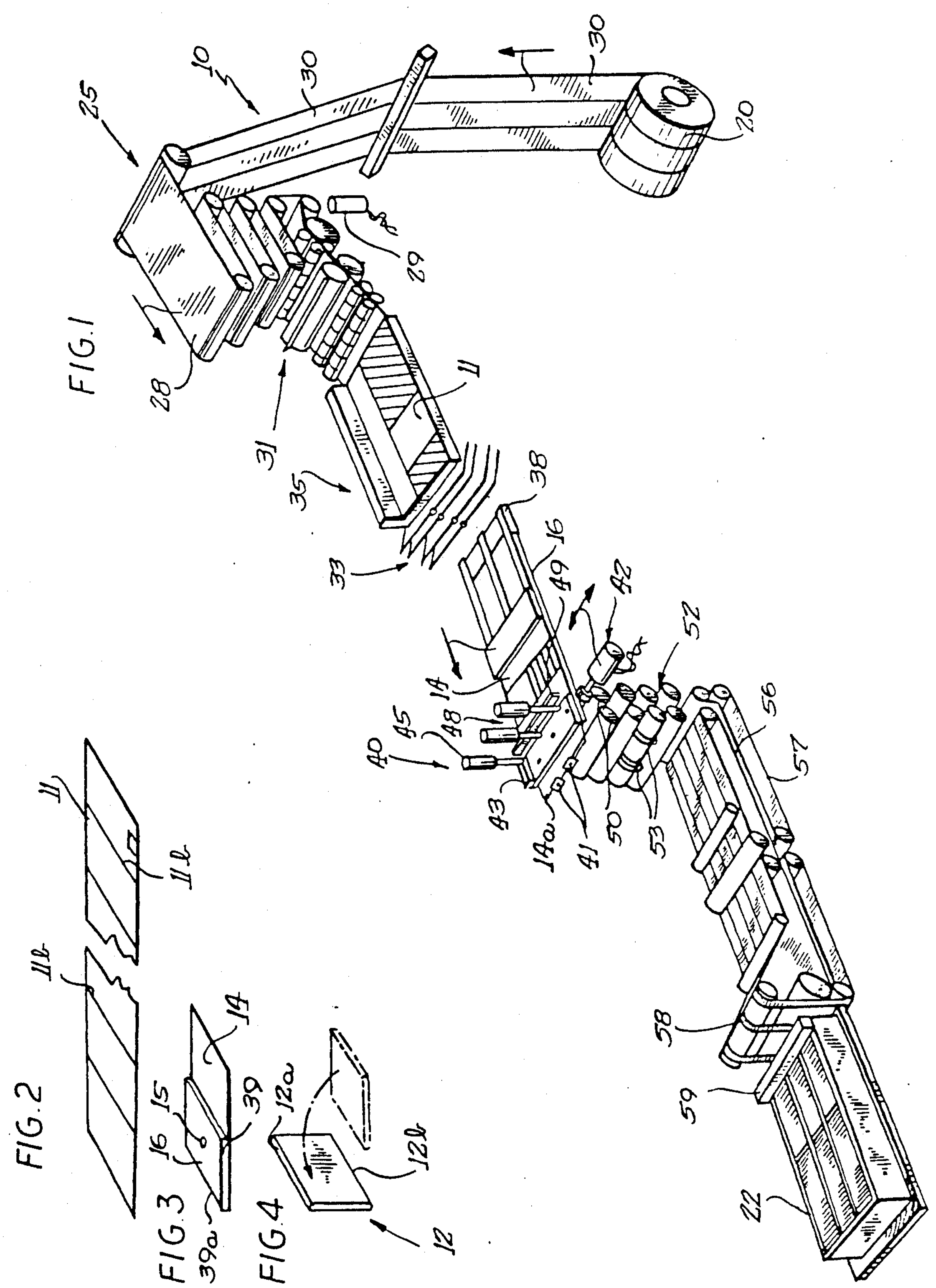
FIG. 1 is a diagramatic view illustrating the preferred method and apparatus for forming the outserts and constructed in accordance with the invention.
FIG. 2 is a perspective view of a sheet.
FIG. 3 illustrates a folded sheet with a wrap-around fold extended prior to being glued.
FIG. 4 illustrates an outsert.
Figure 38:
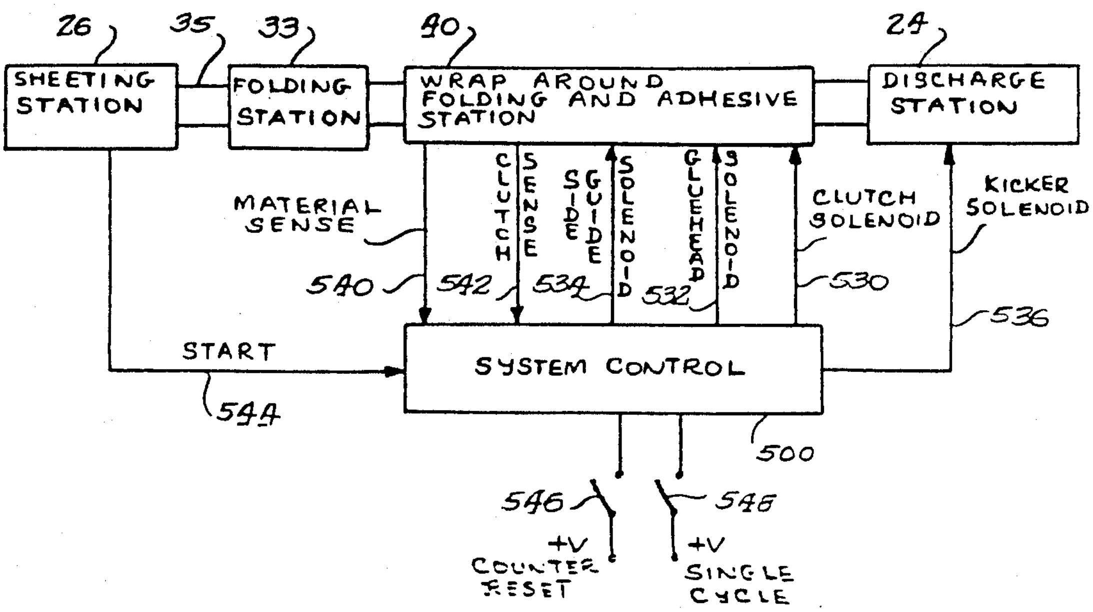
Figure 39:
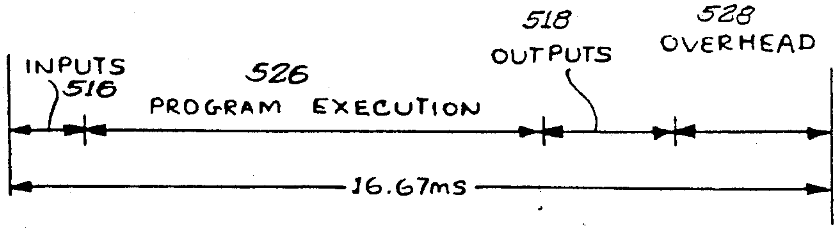
Figure 40:
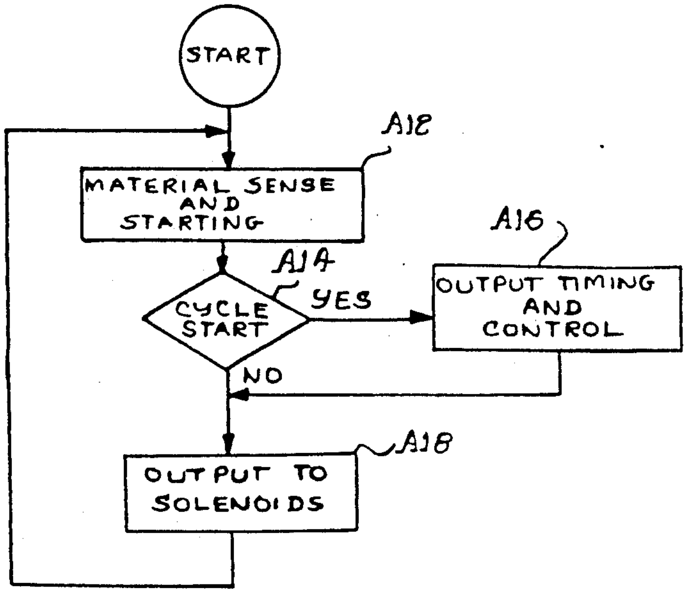
Figure 44A:
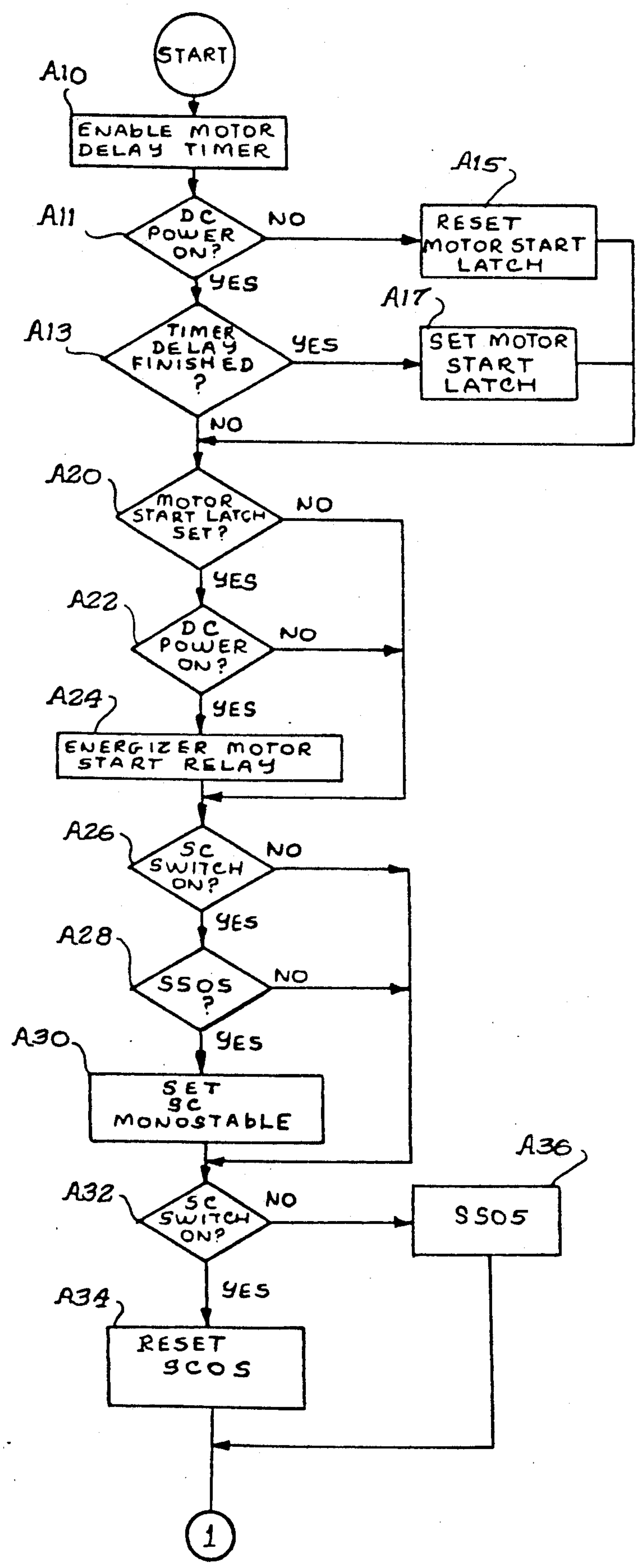
Figure 44B:
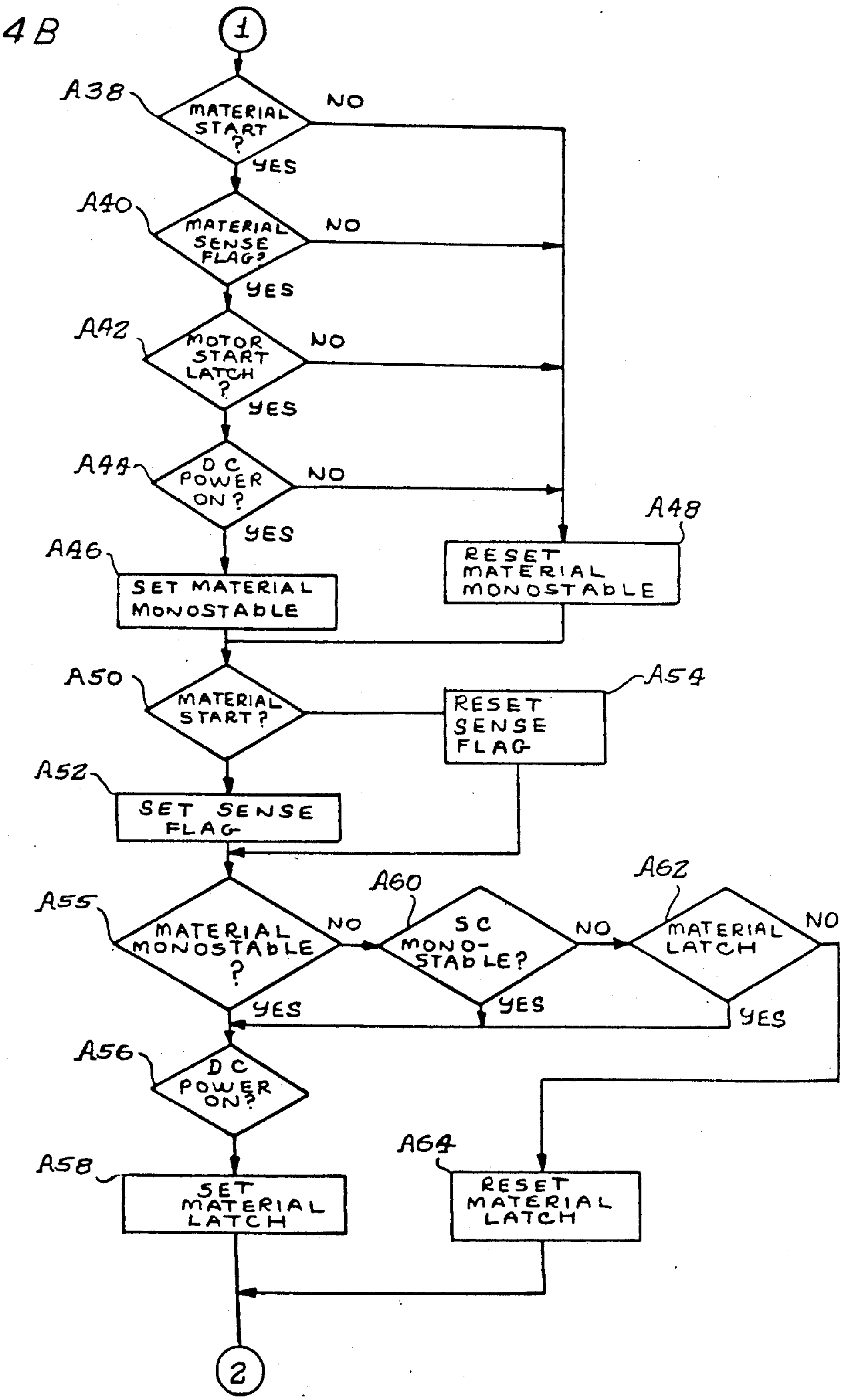
Figure 44C:
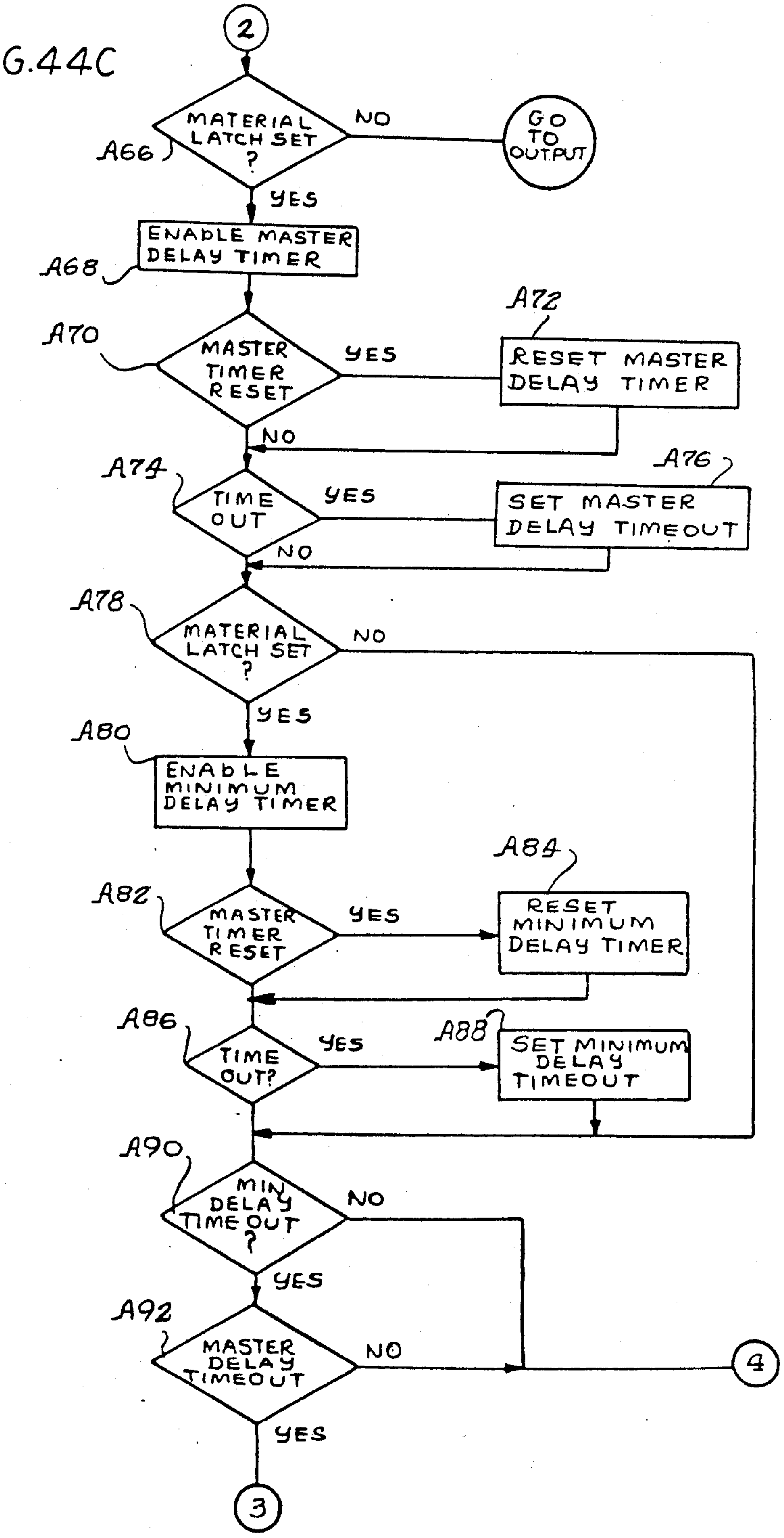
Figure 44D:
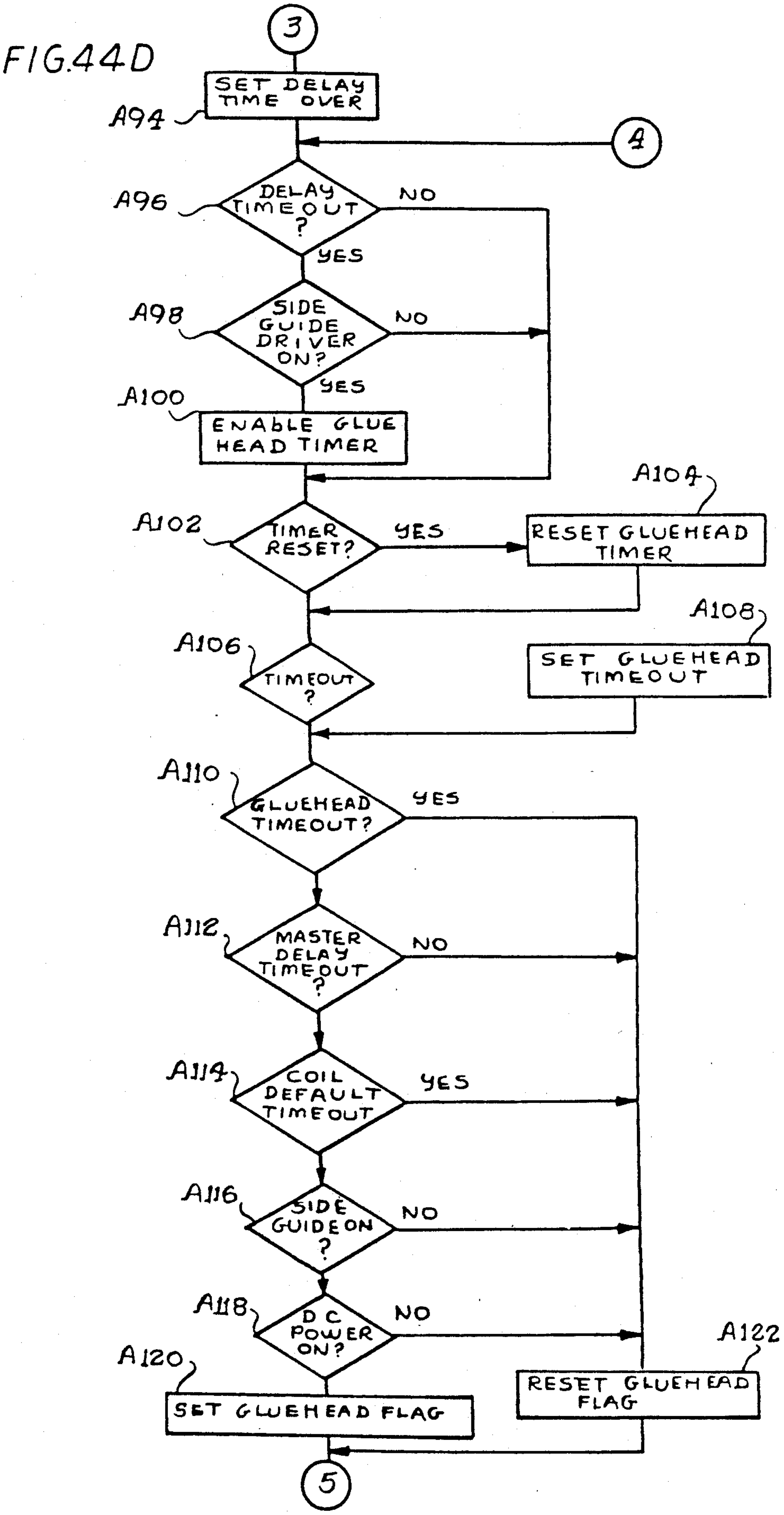
Figure 44E:
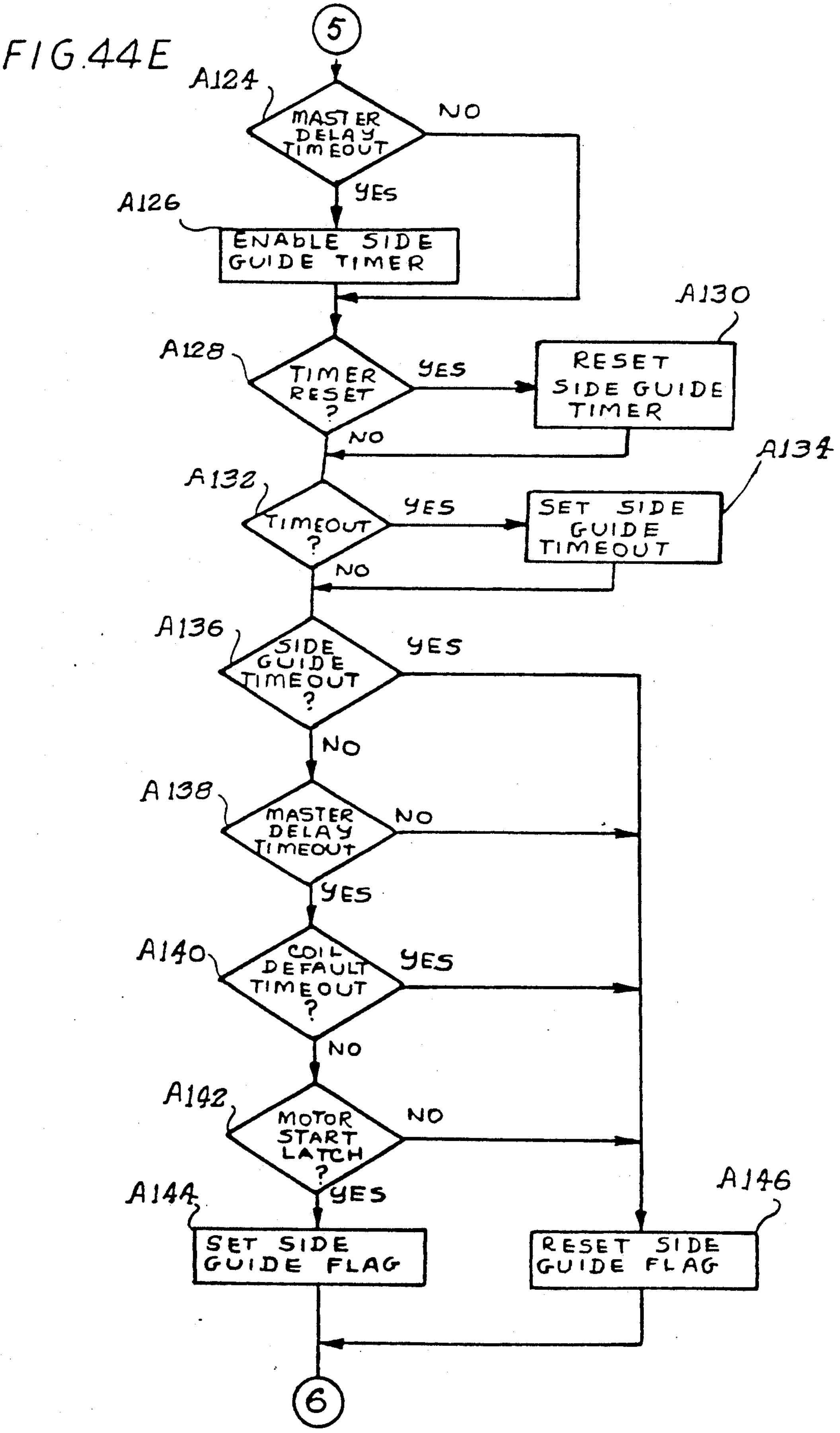
Figure 44F:
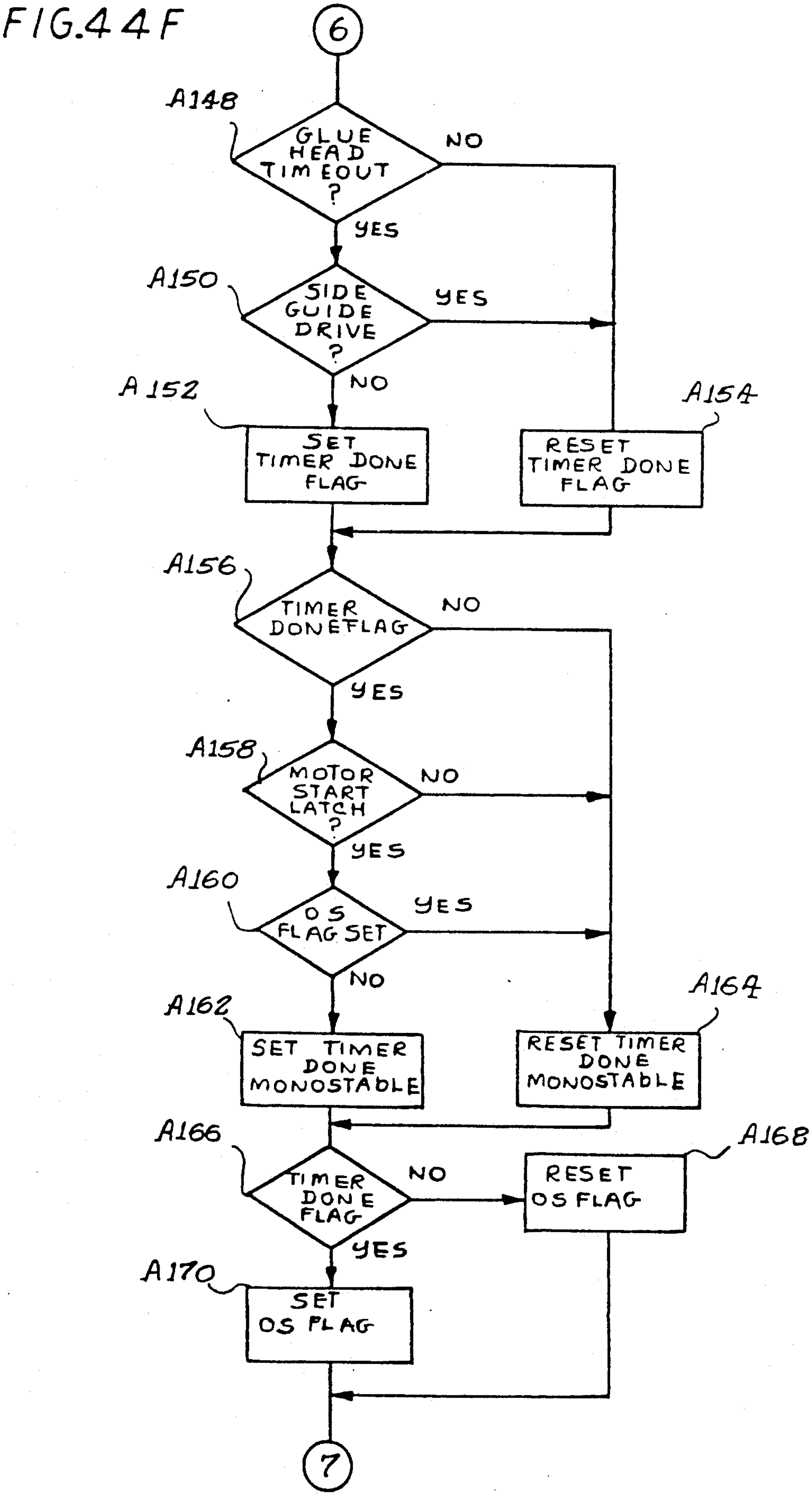
Figure 44G:
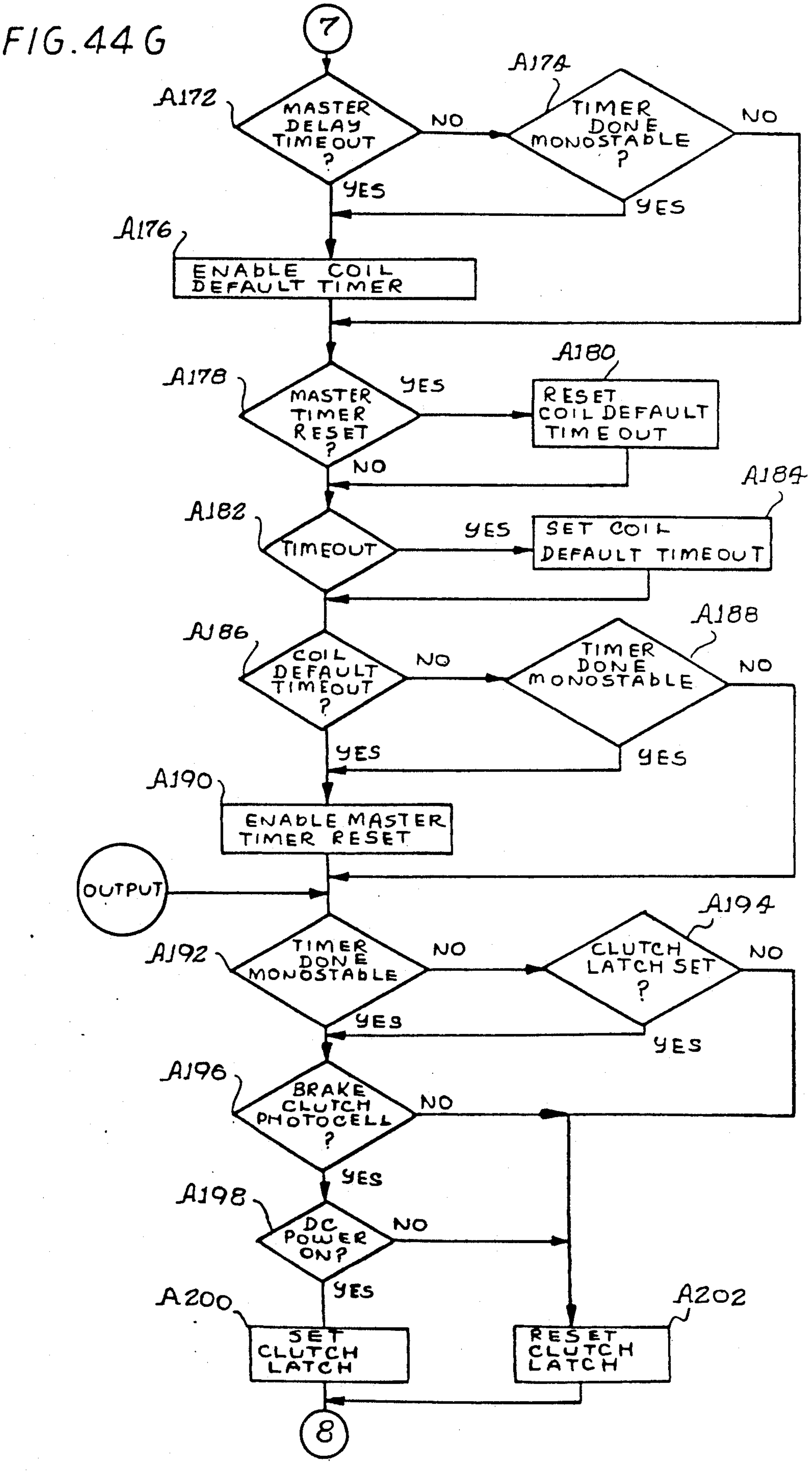
Figure 44H:
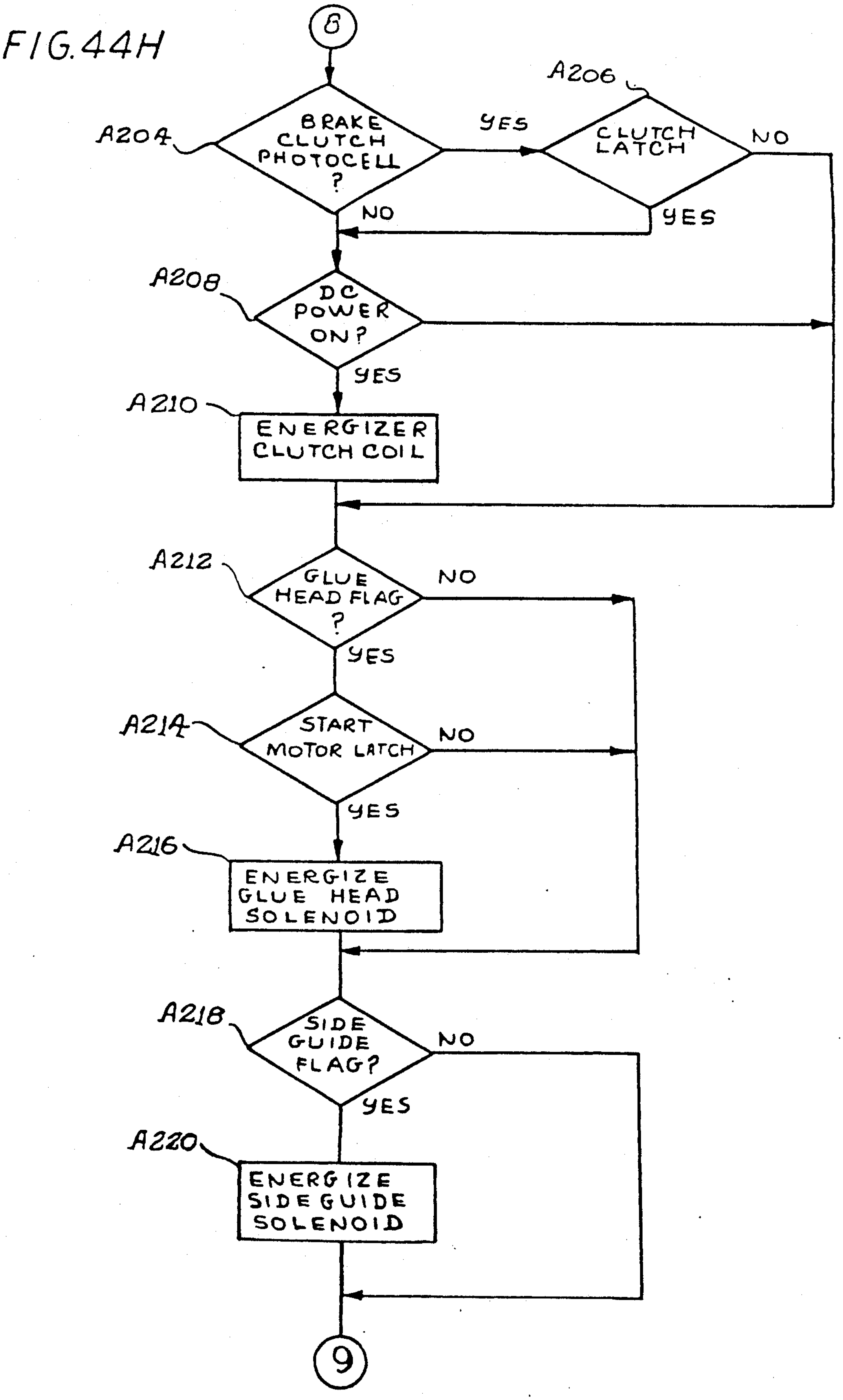
Figure 44I:
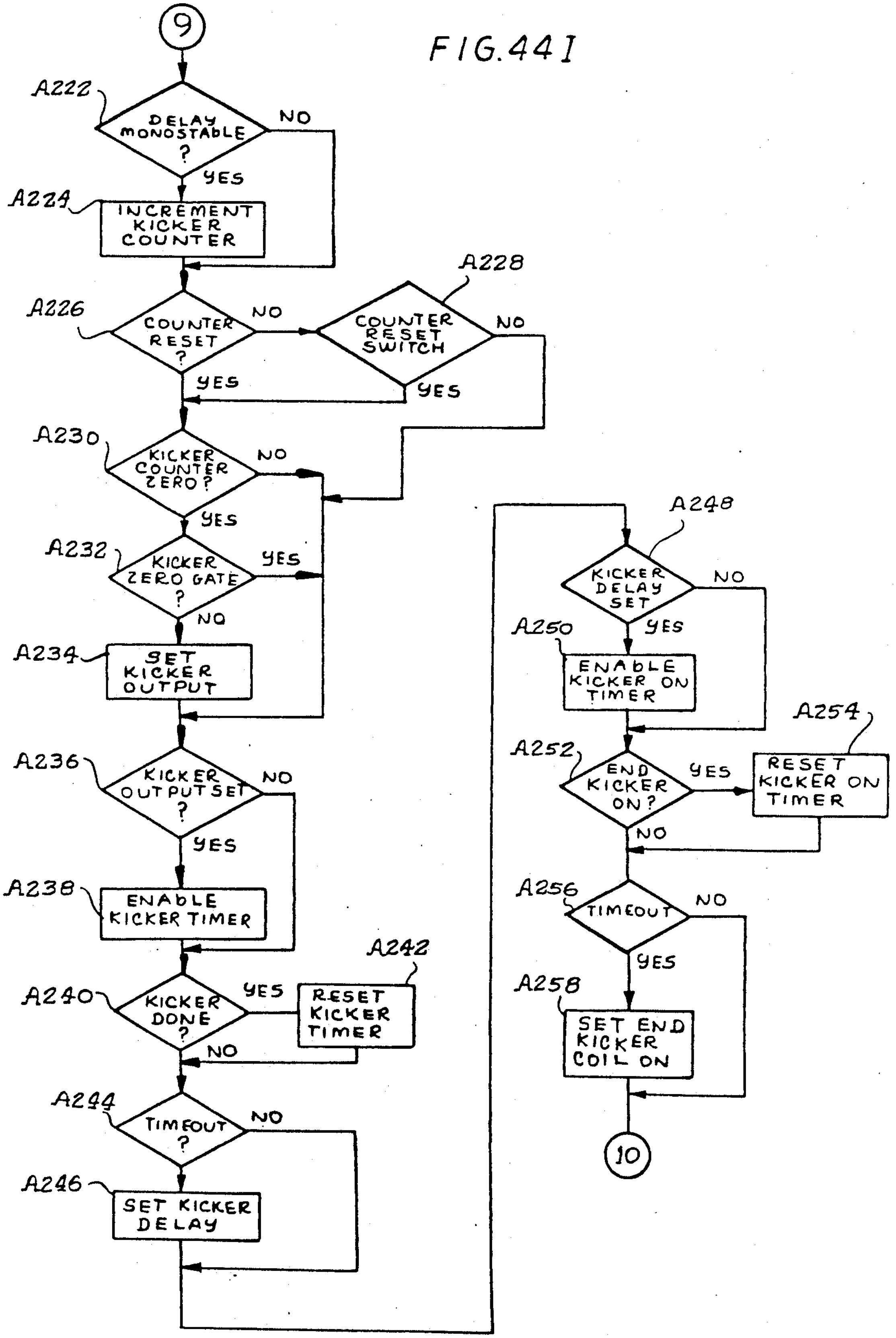
Figure 44J:
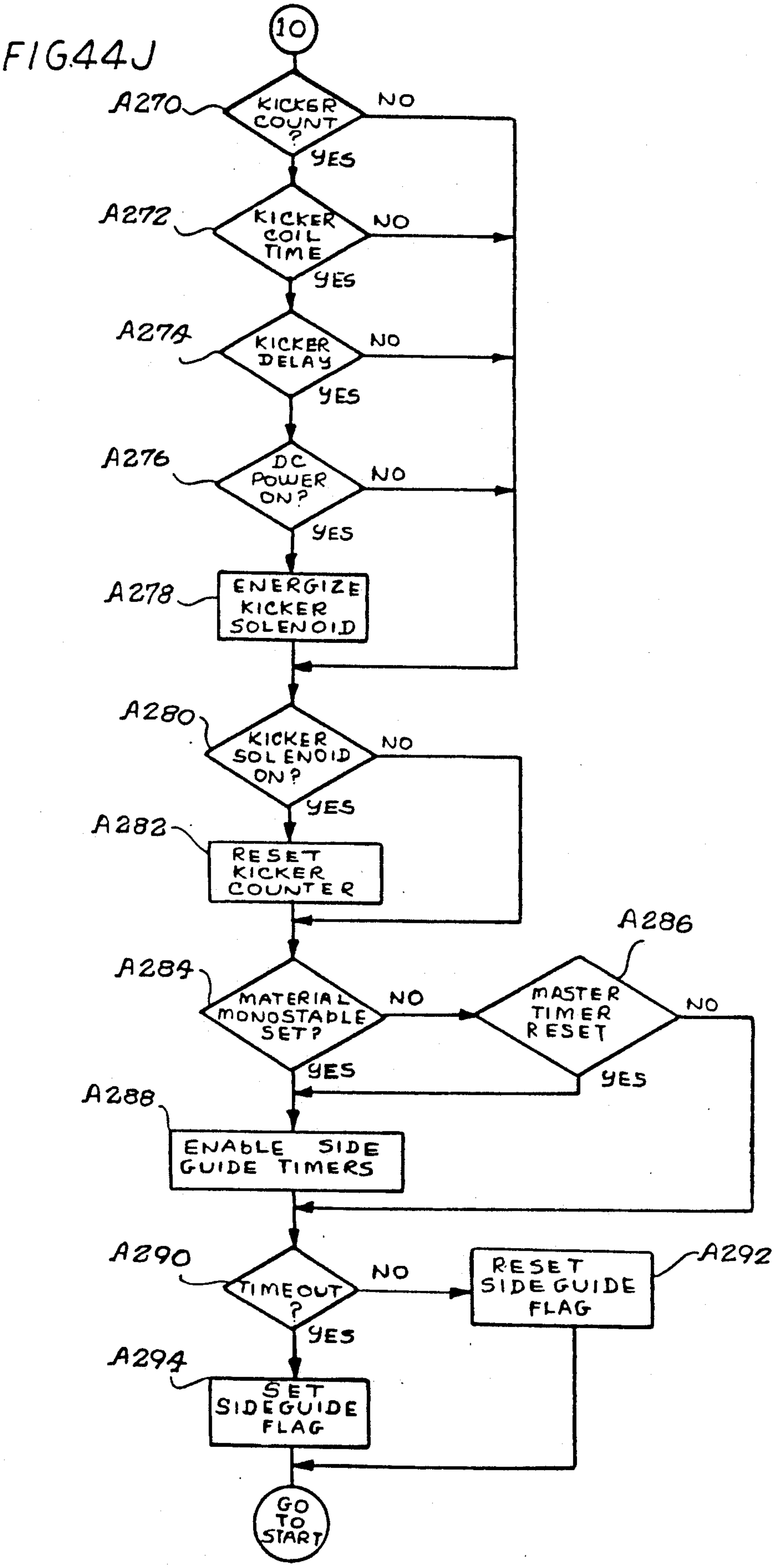

FIG. 38 is a system block diagram of the outsert apparatus illustrated in FIG. 1;

FIG. 39 is a timing diagram of the program execution cycle showing the timing intervals for input, output and overhead;

FIG. 40 is a system flow chart of the timing of the control cycle of the system illustrated in FIG. 38;

FIG. 41 is a system block diagram of the system control illustrated in FIG. 38;

FIGS. 42A–E are timing diagrams of the control pulses for the solenoids of particular control stations illustrated in FIG. 38;

FIGS. 43A–C are detailed timing diagrams illustrating the phase relationship between the brake and clutch mechanism for the clutch solenoid illustrated in FIG. 38;

FIGS. 44A–J are a detailed flow chart of the control program executed by the system control illustrated in FIG. 38; and FIGS. 45A–M are detailed relay logic diagrams of the respective sections of the software flow chart illustrated in FIGS. 44A–J.

PREFERRED EMBODIMENT OF THE DRAWINGS

As shown on the drawings for purposes of illustration, the invention is embodied in a method and apparatus 10 for folding elongated sheets 11 (FIG. 1) which are usually of paper having printed instructions or warnings about possible side effects of a pharmaceutical and the folded sheet has a last, or wrap-around fold 14 which is adhered by a glue or adhesive spot 15 to an adjacent inner fold 16 to complete an outsert 12. The sheets 11 are usually quite long, for example, they are often 9 to 18 inches and, in some instances, may be as long as 50 inches. The sheets are folded with a plurality of folds at fold lines 11*f* and the present invention will be described hereinafter in connection with an 18 inch long sheet which has 1⅛ inch folds between the fold lines for the outsert 12, shown in FIG. 4. The apparatus is particularly suitable for changing the width of the folds between fold lines 11*b* from about ¾ inch to 9 inches or even up to 30 inches. As will be explained in greater detail hereinafter, the typical sheets are slit lengthwise to form a plurality of outserts located side by side. In the trade, if the sheet is split in two to make 2 outserts, it is referred to as being to "2 up". If the sheet is slit twice to form three side-by-side outserts, the term used is "3 up". The present invention is readily adapted to make outserts which are "2 up" to "16 up" or greater.

Longer sheets are more difficult to control and position for folding at high speeds which, by way of example, in the present invention, is 42,000 outserts per hour or 10,500 sheets which are slit to provide a "4 up". A problem with this existing conventional equipment is that the folding and the cutting are closely adjacent each other and in the same station so that adjustments to the cutting and folding were limited because of the limited space available and the need to make timing adjustments with changes in sheet length. Also, in this conventional equipment, the outserts being discharged from the apparatus were collected by an operator and manually inserted into boxes. Often, these machines required 2 to 4 persons, depending on the output, with one person at the forward end, particularly where the sheets were being fed from a sheeting device rather than from a web roll. Thus, there is a need for a new and improved apparatus which can operate at high speeds and handle various lengths of sheets including very long sheets and which can be operated with only one person and which can automatically box the outserts as they are being discharged.

Figure 5:
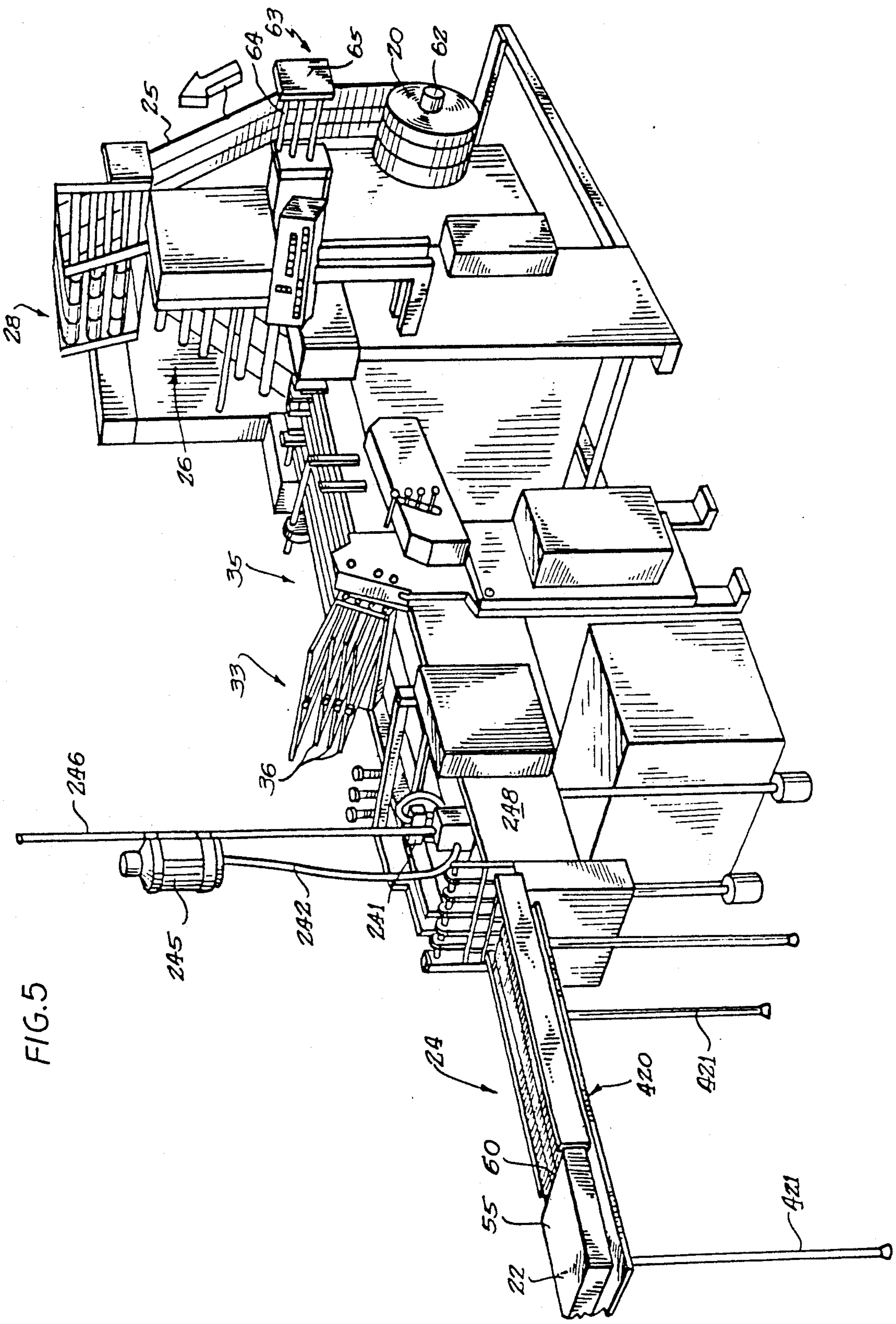
FIG. 5 is a perspective view of the preferred embodiment of the apparatus as diagramatically illustrated in FIG. 1.

In accordance with the present invention, there is provided an apparatus and method, which is illustrated in FIG. 1 and 5, in its preferred form which may automatically form sheets from a web 25 of material in a roll 20 with the sheets being very long, for example, up to 50 inches in length, and with the sheets being folded and glued to form outserts 14. The outserts are preferably automatically boxed at a discharge station 24 into a container 22. The illustrated apparatus forms sheets of a predetermined length from the web 20 by accumulating long lengths, for example, up to 50 inches of the web 20 in accumulator means or station 28 and uses a sensing means such as a photocell 29 to detect marks 30 on the web to operate a severing means 31 at a sheet station 30 to sever the web successively to form sheets each of the same size. It is particularly useful to use the sensing device such as the photocell 29 as a security control device to assure that the proper web 20 is being used. If the wrong roll were placed in the machine, the mark will be at the wrong place and the machine won't cut. A further advantage in use of web rolls over pre-cut sheets is that the roll can be stored without the worry that someone could deliberately or inadvertently mix sheets for one pharmaceutical with those to be used with another pharmaceutical so that the wrong directions would be provided. Preferably, the pharmaceutical manufacturer will have different sensing marks 30 or different lengths and different number of slits to be made for each particular run of outsert and will program a control unit not to run unless the proper roll is in place. On the other hand, as will be explained in more greater detail hereinafter, it is contemplated rather than using a roll that sheets could be fed from the sheet station 26 to the folding station 33.

In accordance with another and important aspect of the invention, the folding station 33, as best seen in FIG. 5, is a complete and separate unit which is commercially available such as a folding unit, Model SVA made by GMBH & Co. Kg, D-7211 Wellendingen 1, Bahnof-Strasse, Federal Republic of Germany, which has a sheet conveyor 35 extending from the folding station 33 to the sheet station 26. The apparatus for severing the sheets has its own drives and motors as does the folding apparatus at the folding station 33 so that the length of the sheet may be readily varied and all that needs to be done is to match the speeds of the folding apparatus to feed speed of sheet delivery from the conveyor 35. The folding means 33 at the folding station only sees sheets which are being fed to it from the conveyor 35; and hence, the folding apparatus is not concerned whether or not the incoming sheets were from the illustrated web and severing system or from a stack of pre-cut sheets being fed from the stack at the sheet station 26.

At the folding station 33, conventional folding plates 37 and rollers 36 (FIG. 12), by way of example only, fold the sheet 11 in a well-known manner into the form shown in FIG. 3 where there is an unfolded wrap-around section 14 remaining when the sheet leaves the folding station 33. When the folded sheet leaves the folding station, the folded portion 39 leads the wrap-around fold 14 in the direction of forward travel on a conveyor means 38 which conveys the folded sheet into a wrap-around folding and gluing station 40.

In accordance with another important aspect of the invention, the precision of the last fold, and the glueing of the wrap around fold 14 is accomplished by precisely positioning the folded sheet at the folding station. More specifically, it is preferred that the leading edge 39*a* of the wrap- around section 39 be stopped in its forward travel by stops 41 and, in a millisecond of its stopping, that a side jogging means 42 push the folded sheet against a side stop 43 so that the sheet is positioned precisely at which time the adhesive applicator means 45 is actuated to apply the adhesive spots 15 immediately followed by the folding means 48 being operated to fold the wrap-around fold 14 against the adhesive spot 15 on the inner fold 16 to adhere these folds together and thereby complete the formation of the outsert shown in FIG. 4.

Also, in accordance with an important aspect of the invention, the folding means 48 includes an overhead folding knife 49 which engages the folded section 39 of the folded sheet and pushes the folded section into the nip of underlying folding rollers 50 which force the wrap-around fold 14 tightly against the glue spot 15 and against the inner fold 16 to complete the outsert. Herein, the folding rollers may be provided with a slitting means 52 which preferably is in the form of circular knives 53 on a pair of slitting rollers which slit the outsert into a "3 up". That is, the outsert is slit at each of the illustrated cutting knives 53 to form three distinct separating outserts 2, each of which has a glue spot 15 adhering its wrap-around fold 14 to the inner fold 16.

Also, in accordance with an important aspect of the invention, the outserts 12 are reoriented and discharge automatically in an on-edge position into a container 22. More specifically, the discharge means includes a number of pairs of belts 56 and 57 which convey the outserts along a horizontal path of travel until discharge, at which time the outserts travel upwardly along an upward conveying run 58 to abut a stop 59 adjacent which is located at the container 22 with each successive outsert pushing the previous outsert into the container, as shown in FIG. 1 and 5. As will be explained in greater detail hereinafter, the ends of the container 22 are mounted and held on a table 61 so as to provide an open mouth 60 for the container into which are pushed the outserts so that they are automatically positioned without further manual handling.

Also, as will be explained in greater detail hereinafter, a counting and jogging means 62 (FIG. 36) may be provided to jog outserts sideways after a predetermined count, within the container. For example, after every two hundred and forth-nine counts, the two hundred and fiftieth insert may be jogged, or pushed sideways to provide a visual indication of every 250 outserts in a column in the container 22. Thus, it is easy to remove a predetermined count of 250 or 500 outserts from the box. The count at the discharge end of the apparatus is also important so that the pharmaceutical packager knows the precise number of outserts and can match this to the number of pharmaceuticals packaged so that he is certain that each package has an outsert. The count at the discharge end of those being boxed is a better control than counting sheets at the sheet feeding station because, during startup, sheets may be lost and also, if a sheet should jam, it will be lost and not accounted for if sheets are only counted at the sheet station 26.

Figures 6, 7:
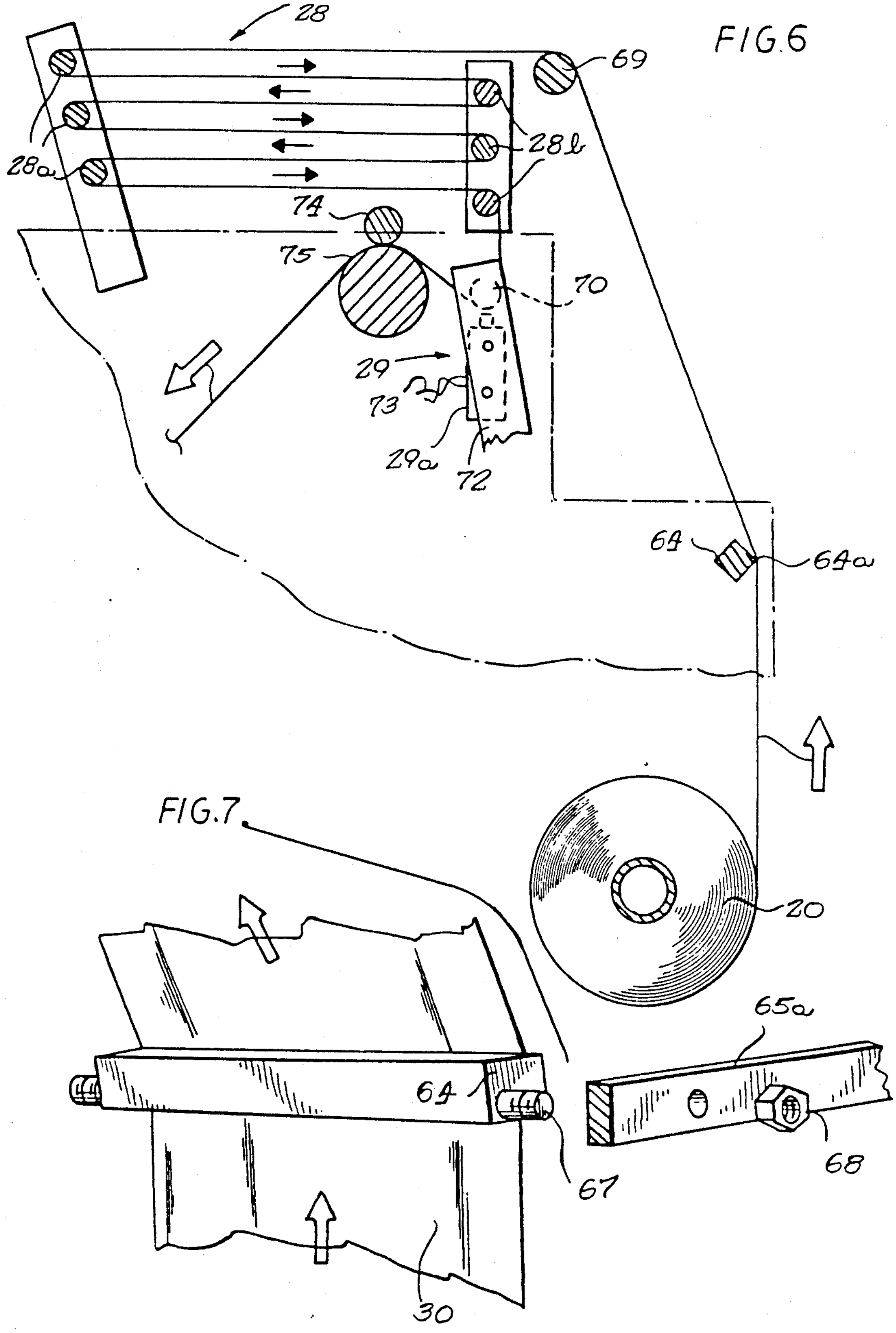
FIG. 6 is a partially sectioned view of an accummulator for the web.
FIG. 7 is a perspective view illustrating a de-curling bar.

Referring now in greater detail to the more specific elements shown in the illustrated and preferred embodiment of the invention, the roll 20, from which is unwound the web 25, is mounted on a suitable means in the form of a rotatable shaft 62 (FIG. 5) which allows the roll 20 to turn to unwind the web for upward travel past a decurling unit 63 which includes a decurling bar 64, as best seen in FIGS. 6 and 7. As best seen in FIG. 6, the decurling bar 64 has an edge 64*a* against which is past the web so as to be decurled and bent while sliding therepast to take out any of the curl in the web due to its previously having been wound in a circular configuration on the coil 20. The decurling bar 64 is mounted on a suitable bracket or support 65 and is eccentrically mounted by an eccentric stub shafts 67 and is fastened at its threaded ends by nuts 68 to a bracket bar 65 of the bracket support 65. By turning the eccentric shafts 67, the position of the decurling bar may be changed so that with amount of deflection and curl may be varied, if desired.

Figure 8:
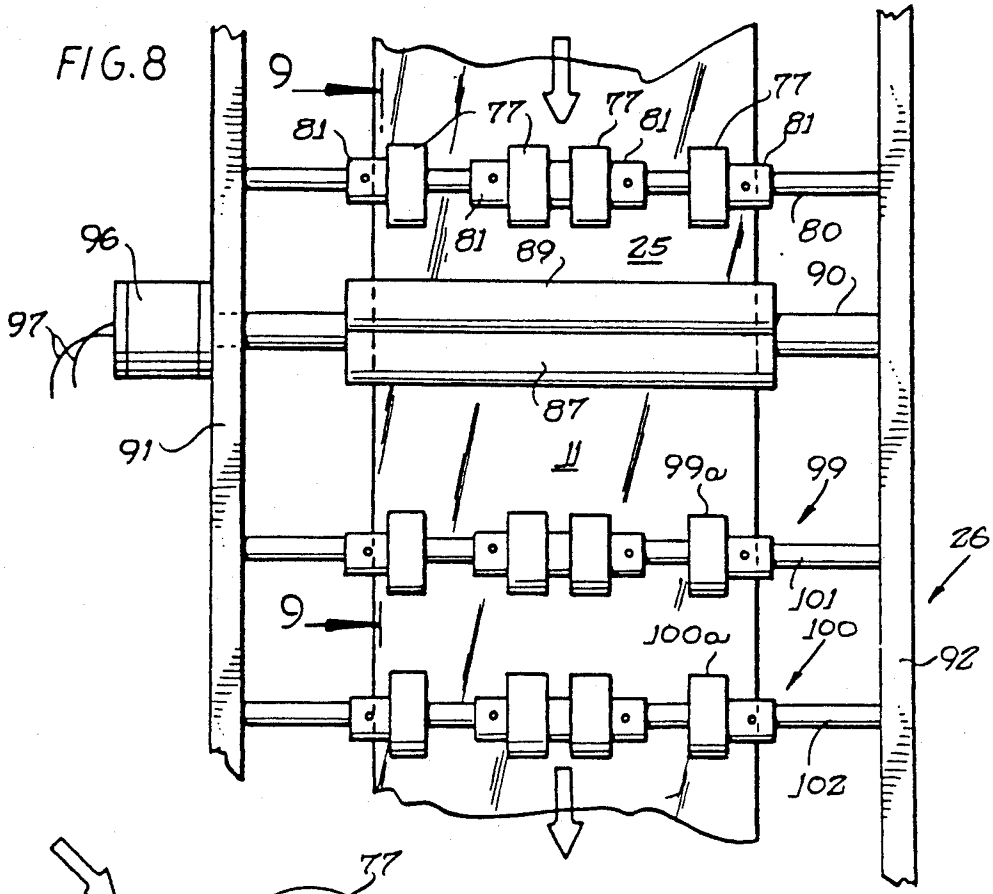
FIG. 8 is a plan view of a severing station.
Figure 9:
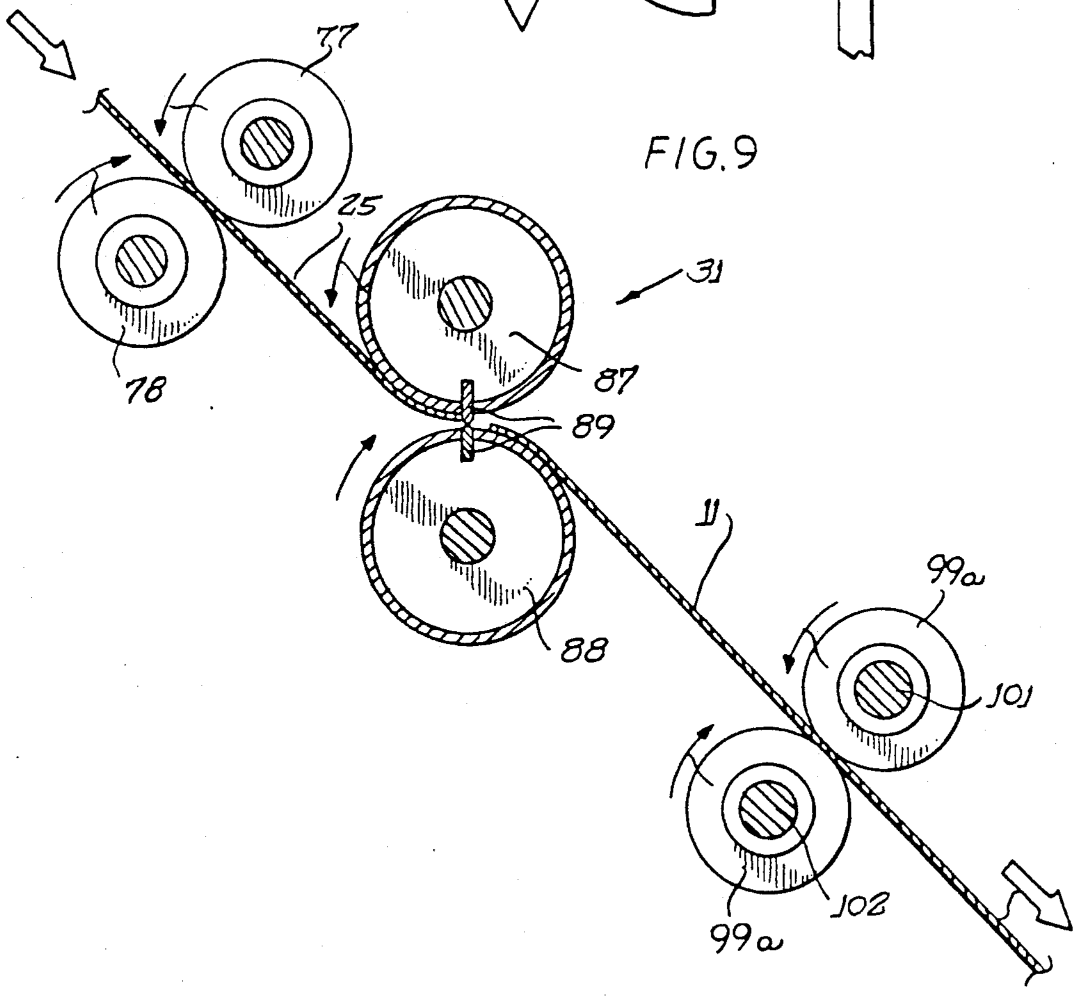
FIG. 9 is a cross sectional view taken substantially along the lines 9—9 of FIG. 8.

The web 20 proceeds upwardly from decurling station into the accumulator 28 in which large lengths of the web are positioned to travel back and forth in a zig-zag manner between rollers 28*a* at the forward side and rearward rollers 28*b* at the rearward side of the accumulator. The web travels over a roller 69 into the accumulator 28 and from the accumulator the web travels downwardly beneath a lower roller bar 70 at which is located the sensing means 29 which detects the mark 30 on the web. Herein, the sensing means is in the form of a photocell 29*a*, which is mounted on a bracket 72 and which is electrically connected by wire 73 to the control circuit for the severing means 31 at the sheet station 26. As shown in FIG. 6, the web travels past the photocell 29*a* and through the nip of drive feed rollers 74 and 75 which are power driven to continue to feed the web forwardly to the sheet station 26 at which are another pair of feeding rollers 77 and 78, as best seen in FIGS. 8 and 9, which feed the web into the severing means 31. As best seen in FIG. 8, the rollers 77 are mounted on an elongated drive shaft 80 which is motor driven so as to feed the sheets forwardly. The feed rollers 77 are mounted by axially slidable bushings or collars 81 on the drive shaft 80 so as to be positioned axially along the drive shaft at positions to drive different widths of web. There are four separate driving rollers 77 shown in FIG. 8 for driving the web by contacting a web adjacent its outer edges and with a pair of central rollers engaging the center of the web.

The illustrated and preferred severing means comprises a pair of severing shafts 87 and 88, each of which has a matched cutting blade 89 thereon. When the cutting blades rotate to opposed positions, as shown in FIG. 9, the blades shear the web 25 to form a sheet 11 on the lower downward side of the severing blades. As best seen in FIGS. 8 and 9, the severing shafts are mounted for rotation in spaced parallel side frame members 91 and 92; and the shafts are driven by one revolution clutch and brake means 96 which is connected by wires 97 to the control unit. The one revolution clutch and brake means is controlled by the photocell 29*a* connected by wire 73 to the control unit so as to be operated for one revolution when the mark 30 is sensed by the photocell 29*a*. Thus, it will be seen that the length of the sheet 11 is determined by the distance between successive marks 30 on the web 25. Thus, without changing mechanical drives or repositioning the web feed rollers or the cutting blades, the length of the sheet may be quickly varied from one run of outserts to another run of outserts.

The newly cut sheets 11, as best seen in FIGS. 8 and 9, are fed from the sheeting station 26 by a pair of driven feed roller assemblies 99 and 100, each of which have drive rollers 99*a* and 100*a* mounted on driven shafts 11 and 102 spanning side frame members 91 and 92 to drive and feed the sheet 11 forwardly. The feed rollers 99*a* and 100*a* are mounted in a manner similar in the above-described feed rollers 77.

Figure 10:
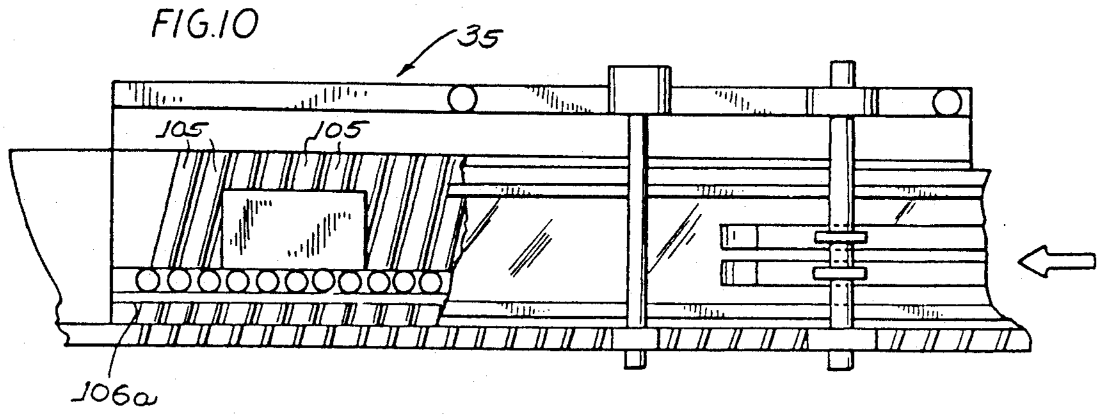
FIG. 10 is a plan view of a conveyor extending from the sheeting station to the folding station.
Figure 11:
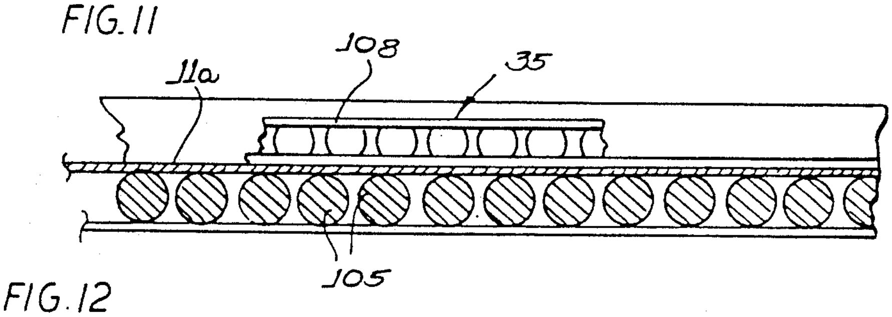
FIG. 11 is an enlarged cross-sectional view taken along the line 11—11 of FIG. 10.

In accordance with an important aspect of the invention, the folding station 33 includes a separate folding device or unit 34 which is totally separate from the sheet station 26. Thus, it is possible to substitute for the web accumulator 28 and the web severing means 31, a stack sheet feeder having a stack of pre-cut sheets therein and to feed these pre-cut sheets to the sheet conveyor 35 which extends between the folding unit and the sheeting means 26. The illustrated conveyor means 35, as best seen in FIGS. 10 and 11, is a commercially available sheet conveyor and comes with the Model SVA folder made by Griesser and Kunzman GMBH & Co. The conveyor includes a plurality of underlying roller bars 105 which are inclined to the sheet's path of travel so as to cause the sheet to travel into engagement with a side guide edge 106 as they travel forwardly to assure that the sheets are positioned precisely as they are delivered to the folding rollers 36. The conveyor includes a pair of bottom belts 108 which are disposed beneath the rollers and rotate the rollers to cause the rollers to rotate in a direction to convey the seat forwardly. The side edge guide 106 extends over the sheets and has spherical balls seated therein to ride on top of the sheet to hold it against the rollers. A depending flange 106*a* on the side guide is abutted by edge 11*e* of the sheet 11. The illustrated conveyor is a conventional unit with a variable speed drive for the belts 108 which are timed to the folding rollers and is a well-known piece of equipment and hence need not be described in greater detail.

Figure 12:
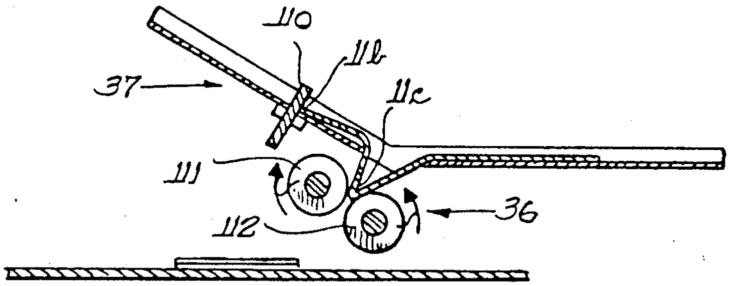
FIG. 12 is a cross sectional view illustrating a folding plate and folding rollers.

The precisely aligned sheets 11 being delivered from the sheet conveyor 35 have the leading edges 11*b* of the sheet, as best seen in FIG. 12, moved into the folding unit 34 and push up against a paper stop bar 110 in a conventional manner to buckle the sheet at 11*c*. A pair of rotating folding rollers 111 and 112 are positioned to grip the sheet at a buckle 11*c* to pull the buckled sheet between the nip of the folding rollers 111 and 112 to provide the first fold at 11*c* as viewed in FIG. 12. The sheet goes through a series of successive folding plates in a well-known manner until it is folded into the condition shown in FIG. 3 in which most of the sheet is folded into the folded section 39 with only the wrap-around section 14 remaining unfolded and projecting from the folded section 39.

The illustrated folding unit 34 has its own separate motor and control device and is commercially available machine and is commercially available from the assignee of the present invention. Thus, it will be seen that the folding unit 34 is independent of the sheet station 26 and can be of any particular construction and can be adjusted for different lengths or widths of sheets independently of any adjustments made at the sheet station 26.

Figure 13:
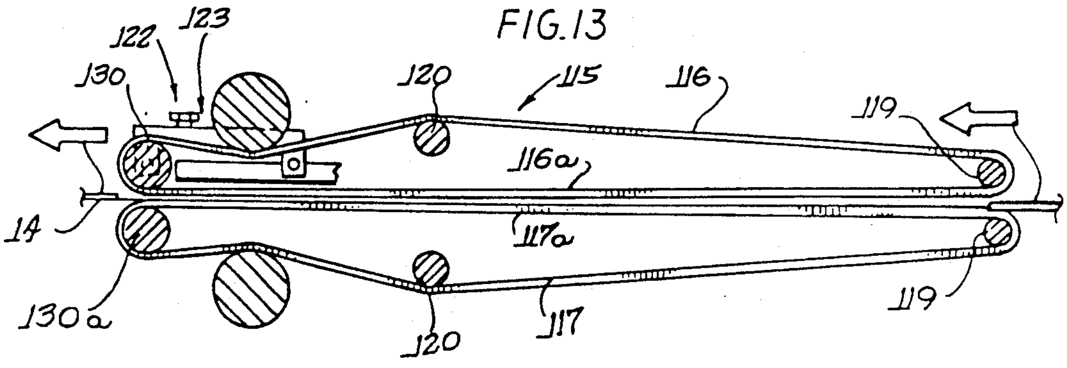
FIG. 13 is a view of a conveyor between the folding station and the outsert forming station.
Figure 14:
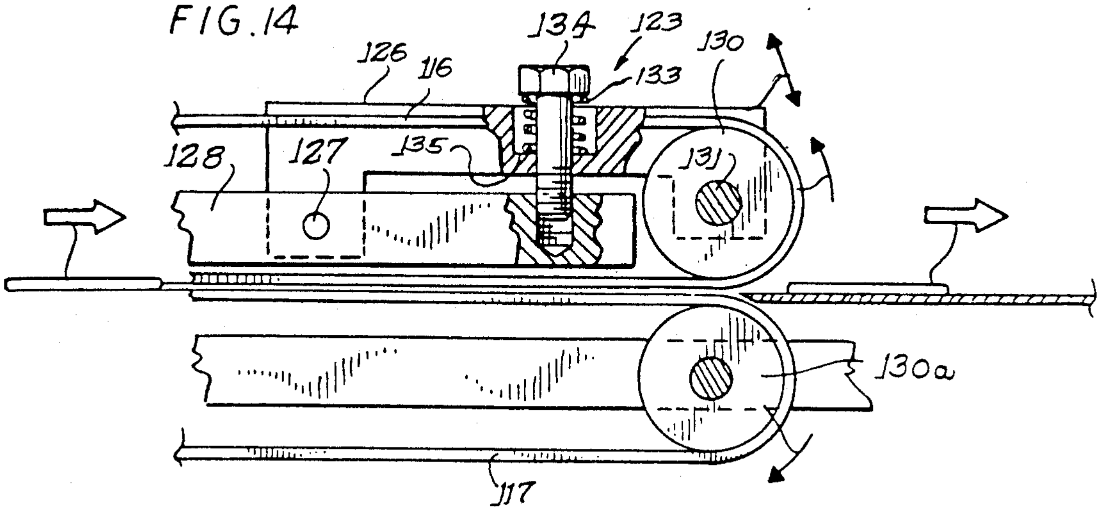
FIG. 14 is an enlarged fragmentary view of the discharge end of the conveyor shown in FIG. 13.
Figure 15:
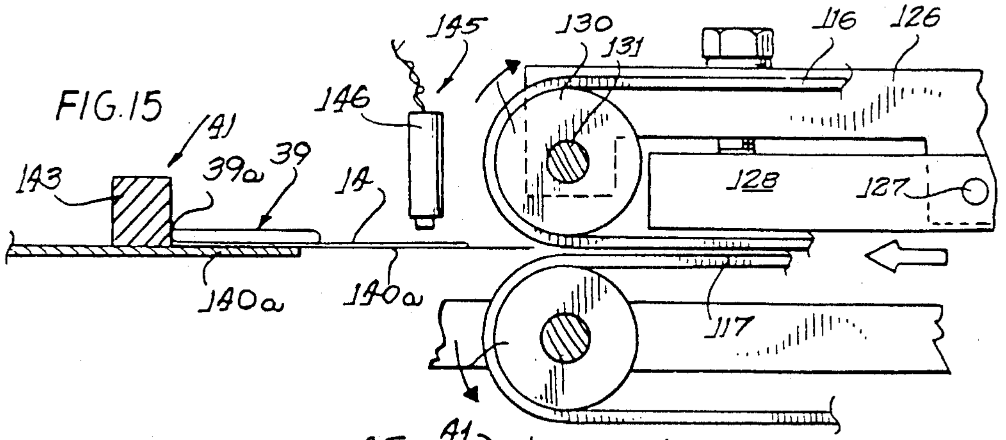
FIG. 15 is a side elevational, partially in section, of the discharge of the folded sheet into the outsert forming station.

From the folder unit, the folded sheets are conveyed by a conveying means 115, as best seen in FIG. 13, to the adhesive and wrap around folding station 40. The illustrated conveyer means 115 includes pairs of conveyer belts 116 and 117 each of which is formed of a plurality of separate strips of fabric conveyer material which define therebetween a generally horizontal travel path for carrying the folded sheet 14, therebetween. Herein, the belt conveyors are provided with enough belts to convey sheets wide enough to be split into sixteen outserts and to convey sixteen outserts. Thus, belts never need to be added. More specifically, the incoming folded sheet with the trailing wrap-around section 14 is fed into the nip between the belts 116 and 117 with a lower run 116*a* of the upper belt engaging the top of the folded sheet while the folded sheet lays on the upper surface of an upper run 117*a* of the lower conveyor belt. The outserts are illustrated as being conveyed in a left to right direction as viewed in FIG. 13 and as shown by the arrows in FIG. 13. The conveyer belts are driven at their inlet ends by power driven rollers 119 and belts pass over tightening rollers and guide rollers 120 to discharge rollers 130 and 130*a* located at a discharge end 122 for the conveyor. At this discharge end, the upper conveyor belt 116 is pivoted for vertical movement by a device 123 which allows different thicknesses of fold sheets to be conveyed and discharge in an unimpeded manner. The pivotally mounted device 123 includes a pair of pivotally mounted bracket arms 126, as best seen in FIGS. 14 and 15 which are generally "u" shape and are pivoted by pivot pins 127 to support frame members 128 which are fastened to the tops of frame members 180*a* and 180*b* of a folding and slitting unit described hereinafter in connection with FIG. 26A–26C. The U shape support bars 126 carry the forward discharge roller 130 which rotates about a shaft 131 which spans and is mounted in a respective pivotally mounted bracket arms 126. The bracket arms 126 are biased downwardly by means of springs 133, as best seen in FIG. 14, which are disposed between the heads of studs 134 and seats 135 in the bracket arms 126. The studs 134 are threaded into the frame support member 128. Thus, it will be seen as the thicker folded portion 39 of the folded sheets begins to discharge from the belts 116 and 117 and begins to move into the nip between the rollers 130 and 130*a* that the thicker portion may forces the upper roller 130 and its shaft 131 upwardly with the bracket arms 126 pivoting about the pivot pins 127. As the folded portion leaves, the springs 133 push downwardly the roller 130 and the belt 116 traveling therebout.

Of particular difficulty in the forming of outserts 12 from long sheets 11 is the forming of the final fold 14 very precisely, particularly when there are a large number of sheets being handled, for example, 10,500 sheets per hour as in the illustrated embodiment of the invention.

Figure 16:
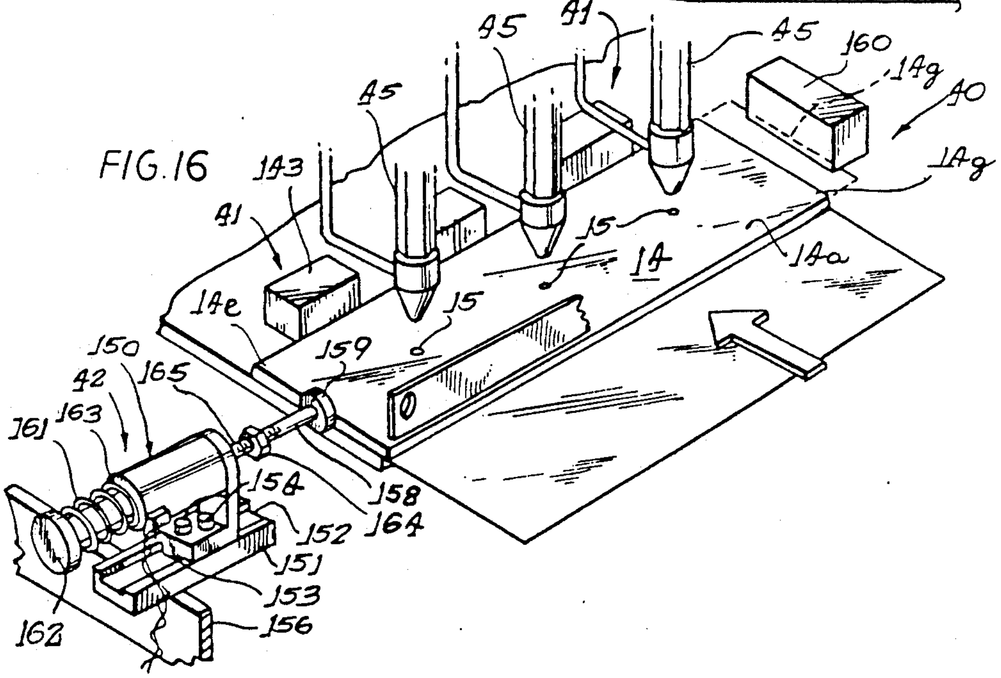
FIG. 16 is a perspective and diagramatic view of the position of the folded sheet at the outsert forming station.

This precise positioning of folded sheets at the adhesive and wrap-around station 40 will now be described hereinafter in connection with FIGS. 15–17. At the adhesive and wrap-around station, there is located a flat stationary, horizontal, flat plate **140*a* across which slides the folded sheet 14 to bring the forward folded edge 14*a* thereof to abut a front stop 41 which limits and arrests the forward travel of the folded sheet at a precise position within the adhesive and wrap around folding station. As best seen in FIG. 15, the conveyor belts 116 and 117 discharge the folded sheet onto the plates 140*a* and the fold sheet slides by its own inertia across the plate to hit the front stop 41. A sensing means 145, preferably in the form of a photocell 146, senses the leading edge 39*a* of the folded sheet 14 as it is discharged from the conveyor belts 116 and 117 and begins a control operation to precisely position the sheet by operating the electrically controlled side jogger means 42. The illustrated side jogger means 42 comprises a solenoid 150, slidably mounted on a support slide bracket 151 mounted on a stationary side frame member 156. The support bracket 151 has a slide channel 152 into which is mounted slide 153 of a solenoid bracket 151. Suitable lock fasteners 154 may lock the slide 153 in position on the slide bracket 151 to position the solenoid plunger 158. Thus, the solenoid is readily positionable to accommodate various widths of sheets to be side jogged. The solenoid includes the plunger 158 with a sheet pusher end 159 which will abut the folded side edge 14*e* of the folded sheet 14 to push the same laterally to bring an opposite edge 14*g* of the sheet against the side stop 43 while the sheet slides along and against the forward stop 41. The solenoid includes a return spring 161 extending between a head 162 on the plunger and the solenoid body 163. A stop nut 164 on the other threaded end 165 of the solenoid limits the return travel by the spring 161. The preferred pusher end 159 on the solenoid plunger is best seen in FIG. 26C and includes a nip of folding rollers 250 and 251. The tip 159*a* extends below the curved leading end 140*b* of the stationary plate 140*a* to engage the thick folded portion 39 of the folded sheet. The pusher end 159*a* has a vertical slot and secured to the solenoid plunger by a screw 159*d*** to allow vertical adjustment of the pusher head.

In the preferred embodiment of the invention, the sheet stops only for a very brief millisecond period of time and the stroke of the solenoid 150 is very quick in that it can do as many as 1100 strokes per minute. The illustrated solenoid pushes the sheet against the side stop 43 so that the sheet is precisely positioned to assure that the folding is done very accurately with the last wrap-around fold 14 being square and providing a good appearance and with the glue spots 15 being precisely located on the wrap-around fold 14 of the fold sheet 11. The adhesive applicators 45 are mounted above the folded sheet which has now been registered by the fixed side stop 43 and the forward stop 41 with the adhesive applicators also being driven downwardly in a precise and timed manner by the control circuit upon completion of the operation of the side jogging solenoid 150.

The particular application of adhesive or glue spots 15 is done at a high rate, for example, 10,500 actuation of the applicators per hour in a foolproof manner. This overcomes a particular problem in the art and is an important aspect of the present invention herein, as will be described in connection with FIGS. 17–25. The applicators 145 are mounted for positioning in both the horizontal and vertical directions by slide brackets 1700 and 200. More specifically, as best seen in FIG. 17, a mounting bar 173 for carrying a plurality of applicators has an elongated slot 174 extending horizontally and into which is positioned a bracket arm 175 which can be slid along the length of the bar 173 to an adjusted position after which a suitable lock threaded handwheel 176 may be tightened to lock the applicator to a position over the folded sheet. The vertical adjustment in a gross manner is provided by the vertical slide 200 which is mounted in a dovetail slot 172 in a movable inner slide 191.

The illustrated glue applicator are precisely precisioned devices which are mounted on a swingable bar 173 which has one end fixed by a pivot pin 181 to a frame bracket 182. The other end of the swingable bar 173 is receivably mounted in a slot support block 185 which has a fastener 187 to lock the pivoted bar 173 in position when it is positioned for working. The reason for allowing the bar 173 to swing to allow easy access to the folding station for removal and replacement of the folding rollers, as will be explained hereinafter.

Figure 17:
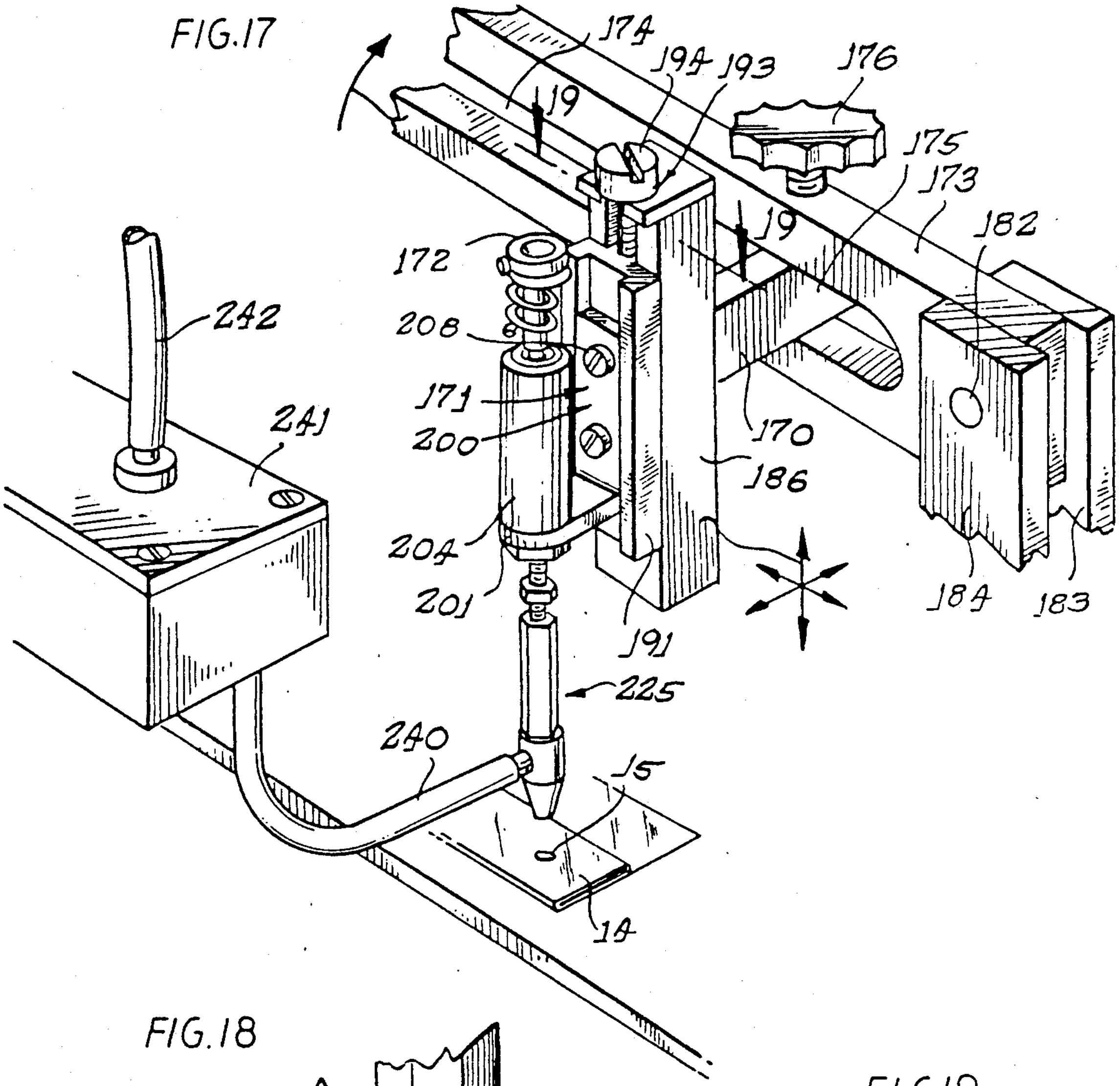
FIG. 17 is a perspective showing an adhesive applicator.

As best seen in FIGS. 5 and 17, the bar 173 may be pivotally mounted at one end by a pivot pin 182 mounted in frame members 183 and 184 and latched down at its opposite end. This pivotal mounting allows the bar 173 to swing to allow easy access to the folding station for removal and replacement of the folding and slitting unit roller, as will be explained hereinafter.

To provide the vertical adjustment for the solenoid operated applicators, the vertically movable slide 191 is slidable within the vertically extending groove 172 in the vertical block 186. A threaded screw 193 (FIG. 17) is connected at its lower end to the vertical slide 171 and is threaded in the block. By turning the upper end 194 of the screw, it is possible to shift and slide the vertical slide 191 vertically with an infinite calibration so that the glue head applicator may be precisely positioned within a thousandth of an inch so that the glue may be precisely located to touch the fold of the outsert with the right pressure.

Figure 23:
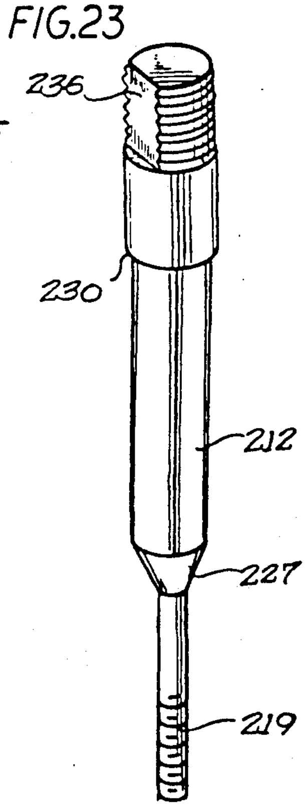
FIG. 23 is a perspective elevational view of the solenoid plunger.
Figure 24:
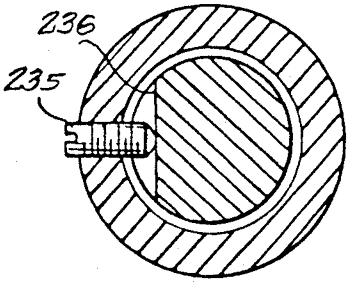
FIG. 24 is a cross-sectional view taken along the line 24—24 of FIG. 20.
Figure 25:
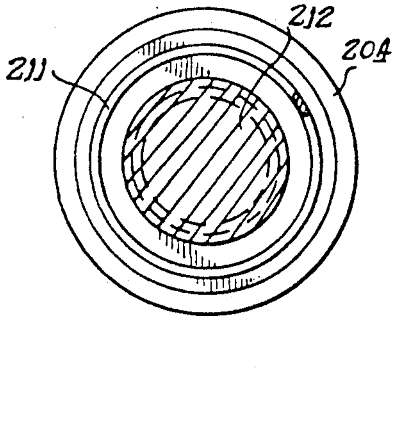
FIG. 25 is a cross-sectional view taken along the lines 25—25 of FIG. 20.

Extending horizontally and laterally from the bottom of the slide 191 is the right angle bracket slide 200 which has a horizontal leg 201 into which is mounted the solenoid body 204. Set screws 208 may be tightened to lock the slide bracket 200 at the desired height in the slide 191. The solenoid operated glue head includes the solenoid body 204 which has an upwardly extending vertically movable plunger 212 extending through the coil 210 (FIG. 21) with a spring 211 biasing plunger 212 upwardly. The spring 211 is a coiled return spring 136 between a plastic washer 216 mounted on top end **204*a* of the plunger body and a head 117 on the plunger 212. As best seen in FIG. 23, the lower end of the plunger is threaded at 219 and has a threaded nut 220 threaded thereon to abut the lower end 204*b* of the plunger body when the return spring returns the plunger upwardly after de-energization of the coil. The energization of the coil force the lower end of the plunger and the attached glue head 225 (FIG. 20) to move downwardly a predetermined distance which is the full end of the stroke of the solenoid. By turning the adjustable stop nut 220**, the glue head plunger stroke is adjusted to have less downward movement or more downward movement.

The coil 210 drives the solenoid plunger 212 downwardly and to prevent a hangup of the solenoid by having its conical end 227 engaged in a conical seat 228

Figure 21:
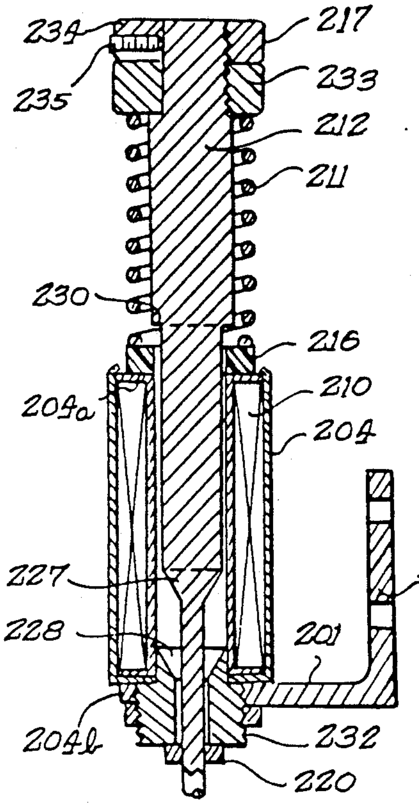
FIG. 21 is a cross-sectional view taken substantially along the line 21—21 of FIG. 20.
Figure 22:
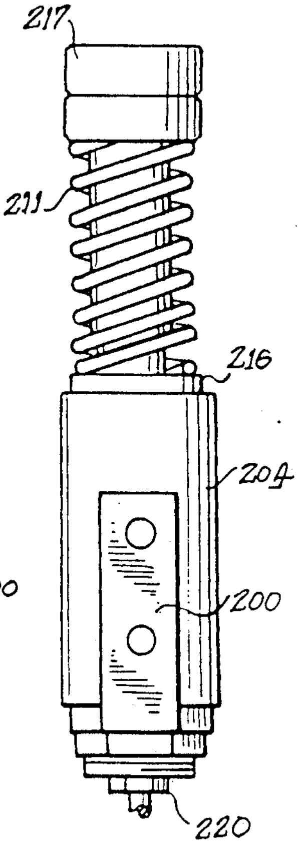
FIG. 22 is a rear elevational view of the adhesive applicator of FIG. 20.

(FIG. 21), it is preferred to provide an upper shoulder 230 on the plunger which will hit the top of the plastic ring or washer 216. Also, as shown in FIG. 21, the lower end 232 of the plunger body may be threaded to be threaded into the horizontal bracket leg 201 of the "L" shape slide bracket 200. The illustrated head 217 of the plunger 212 may include an upper threaded washer 233 and an upper threaded nut 234 with a set screw 235 threaded in the latter engaging a flat 236 on the plunger body.

Figure 18:
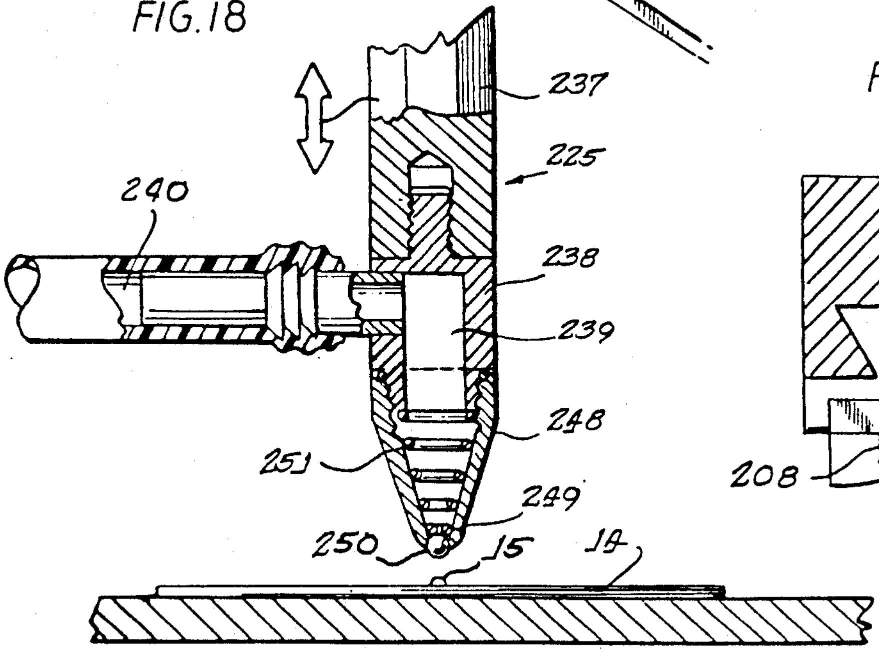
FIG. 18 is an enlarged sectional view of the adhesive head portion of the applicator of FIG. 17.
Figure 19:
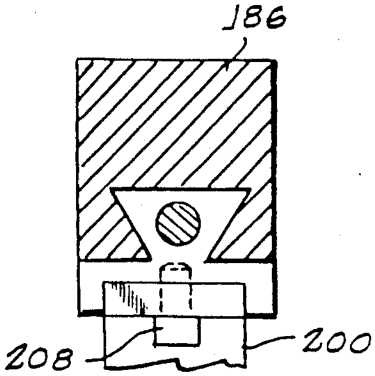
FIG. 19 is an enlarged cross-sectional view through the slide bracket supporting the adhesive applicator.
Figure 20:
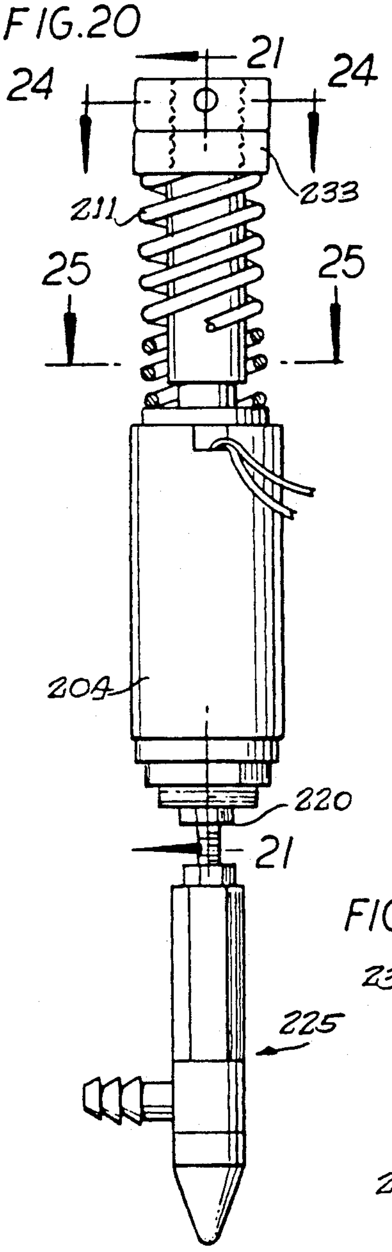
FIG. 20 is an elevational view of an adhesive applicator constructed in accordance with the preferred embodiment of the invention.

The illustrated glue head applicators carry at their lower ends the applicator glue head 225 which is threaded onto the lower end of the plunger at the thread 219. As best seen in FIG. 18, the glue head 225 has a vertical body 237 with a lower valve head 238 having a hollow bore 239 through which glue passes from a tube 240 which is connected to an upper manifold box 241 connected by pipes 242 to a glue or adhesive bottle 245 (FIG. 5) mounted on a vertical post 246 fixed at its lower end at the frame 248. Thus, there is a gravity feed of glue from the container bottle 245 downwardly to the tube 242 to the manifold 241 which is connected by a tube 242 to the respective glue head 225.

The illustrated glue head 225 includes a dispensing tip or nozzle 248 with a conical shape at the lower end in which is a ball valve 249 seated in an orifice 250 and biased thereagainst by an internal spring 251 seated within the nozzle 248. By moving the glue head 225 downwardly with the solenoid 212, the ball 249 is forced upwardly allowing glue to flow out the orifice to leave the spot 15 as shown on the folded sheet 214 in FIGS. 17 and 18.

It will be appreciated that the glue application is a very fast operation with the solenoids capable of being operated at very fast rates such as 1100 strokes per minute so that the glue in operation takes place very quickly, particularly, where as many as 10,500 sheets are being glued per hour. While only a single glue spot 15 is shown as applied for a single slit outsert, a plurality of glue spots may be applied to each outsert slit from the folded sheet.

As best seen in FIGS. 26*a*–26*e*, the folded sheet 14 hits the front stop bar 143 which is part of a removable folding and severing sub-assembly 177 shown in these FIGURES. As the folded sheet moves into position beneath the glue applicators, it travels beneath hold-down wires 178 (FIG. 26*a*) having upturned ends 178*a*. The hold-down wires are spaced above flat plate 140*a* and have their forward ends fixed to a stationary, transverse frame bar 179 which is fixed at its opposite ends to the top of parallel side frame members 180*a* and 180*b*. The front stop bar 143 has holes therein through which extend the hold-down wires 178 and the front stop bar is movable toward or from the transverse frame bar. More specifically, the front stop bar is mounted to parallel threaded screws 187 at opposite ends thereof. The screws are threaded into the transverse frame bar 179 and serve to position the stop bar at desired distance from the folding rollers.

Cooperating with the first serrated folding roller 251 is a hold-down and feed roller 220 (FIGS. 26*a* and 26*b*) which is mounted directly above the upstream folding roller 251 and which serves to force the thicker folded section 39 to engage the top of the folding roller 251 and to be driven by the serrated roller 251 which is turning a direction to feed the sheet towards the front stop bar 143. This hold down and feed roller 220 includes a central shaft 221 on which are mounted rotatably wheelers or rollers 222 each carrying a pair of circular "O" rings 223 to engage the folded sheet thick section 39 at four spaced locations on the sheet as viewed in FIG. 26*d*. The "O" rings and rollers are mounted on a bail shaft 224 mounted at its opposite ends to bail arms 226 which are pivotally mounted at their center portions by pivot pins 227 to the upper ends of the folder unit vertical frame wall 180*a*. Opposite from the bail shaft 224, the bail arms 226 have tail portions 228 superimposed over springs 229 which raise the tail portions upwardly and biase the shaft and rollers 222 downwardly to engage the upper sides of the folded sheet section 39. The springs 229 have lower ends seated in seat 230 in the upper end walls 180*c* of the end walls 180*a* and 180*b*. The "O" rings 223 are spaced above the thin wrap-around fold 14 and are only in contact with the thick section 39 for a brief instant and then are spaced above and from contact with the wrap around fold 14.

Following the application of the glue, the folded sheet is now ready for the wrap-around fold 14 to be made and to be adhered to the folded section 39. While various folding devices could be used, the preferred and illustrated folding device employs a vertically moving folding blade or knife 49, as best seen in FIGS. 26–30, which operates in conjunction with the folding rollers 50 to complete the folding and the application of the glue spot with pressure to the wrap-around fold 14. Of particular importance is the vertical orientation of the rollers in a unit having a common drive. When the folding blade 49 moves downwardly, as best seen in FIGS. 26 and 27, the fold 14*f*, as viewed in FIG. 27*a*, is made with the upper set of vertical rollers 250, 251 which do the initial folding. Herein, the folder rollers 250 and 251 are shown in FIG. 26 as being the top two rollers of the stack of rollers with the next pair of rollers being a transfer pair of rollers 253 and 254 which transfer the now formed outsert downwardly into the nip between a pair of underlying slitter rollers 255 and 256 each of which carry slitting knives to slit the outsert which is being held at the upper portion by the transfer rollers and which is being held at the lower slit ends by a lower pair of transfer rollers 258 and 259. Herein, the slitting rollers 255 and 256 are also provided with a pair of "O" rings 262 which are annular rubber rings which engage the outsert as it is being slit and serve to feed the outsert along with the transfer rollers 253 and 254 and 258 and 259. The annular slitting rings 52 are best seen in FIG. 29 wherein they are slitting the outsert 14. As best seen in FIG. 30, the pair of slitting knives 52 have severed the outsert into a "3 up" or three pieces of outsert from the single folded sheet with the three outserts now being discharged by the lower transfer rollers 258 and 259 downwardly into a throat or nip 260 of the discharge conveyor belts 56 and 57 (FIGS. 26).

This folding and slitting unit is easily removed from the machine and replaced with another unit which has the proper number of slitter knives or disks on the slitter rollers when changing from one run to another run. The rollers are all connected by gears in the unit to run at the same speed.

More specifically, the upper pair of folding rollers 250 and 251 span the pair of upstanding frame plates 180*a* and 180*b* and have stub shaft ends 250*a* and 250*b* (FIG. 26*d*) carrying gears 260 and 261 which are driven to turn folding rollers 250 and 251. The folding rollers have serrations 262 thereon to assist in gripping and feeding the folded sheets and newly formed outserts.

Likewise, the transfer rollers 253 and 254 have longitudinal serrations 262 on their own surfaces to grip the outsert. The rotational center lines of the transfer rollers are spaced from the rotational center being for the folding rollers 250 and 251 such that the outsert is always gripped when the outsert is extended therebetween so that the outsert is not free to move or shift relative to these rollers or relative to the slitting rollers 255 and 256 or to the lower transfer rollers 258 and 259.

The upper transfer rollers 253 and 254, the slitter rollers 255 and 256, and the lower transfer rollers 258 and 259 each span the folding unit upstanding side walls 180*a* and 180*b* and are journaled therein to rotate about parallel horizontal axis. Each of these shafts has a gear 260 at its opposite end and the gears are meshed to drive the respective rollers in directions to drive the outserts downwardly and at the same speeds.

The operation of the folding knife and its downward timing movement will now be discussed in connection with FIGS. 31, 32, 33, 34 and 35. As best seen in FIG. 32, the folding knife is in the form of a thin vertical bar 275 which has a vertical end leg 276 adjacent one side plate 278. The opposite end of the folding knife bar 275 includes a block 283 fastened by fasteners 284 to the bar and the block 283 is connected to an upper threaded end 285 of a slide piston shaft 286 which slides in a vertical bearing block 287 fixed to the side plate 289. The side plate 289 is a stationary vertical side frame plate and is parallel to the side frame plate 278 and extending in the direction of travel in the sheets. By unloosening the nut 290, which is threaded onto the upper end 285 of the piston shaft 286, the knife blade 49 may be lifted upwardly and removed to allow access to the folding unit which may be easily removed. The folding knife 49 thus is guided for vertical movement by the piston shaft 286 and moving vertically in a vertical bearing block 287 and with the roller 279 slided vertically in the vertical slot 281.

To move the folding blade in timed relationship, it is preferred to have the lower end of the piston shaft 286 connected by a pin 295 to a crank arm 296 which is adjustable in length and which has a lower end 298 connected to a crank pin 299 mounted on a rotatable crank disk 300 fixed to a rotatable horizontal shaft 301 which is journaled for rotation in the stationary frame plate 289.

As above explained, the preferred operation for the folding knife 49 is by driving of the crank 300 to move the connecting rod 296 to move the piston shaft 286 vertically within the vertical slide bearing 287 in timed relationships as determined by the electric control system described hereinafter. The electrical control unit at the time for the knife operation causes energization of electromagnetic clutch 310 (FIG. 31) which is mounted on one end of a horizontal shaft 311 spanning the side frame plates 278 and 289. Here the clutch clutches a gear 312 also mounted on the shaft 311 adjacent the clutch so as to allow an idler gear 313 mounted on a stop shaft 314 to transfer power from a drive gear 315. To provide a one revolution timing operation for the folding knife 49 and to always stop and hold the knife 49 in its upper, raised position, the drive shaft 311 carries a rotatable flag or signal 320 past electro photocell units 321 which are connected by wires 322 to the controlled unit, so that upon one revolution of the flag, the photocell unit 321 sees the flag and operates the control unit which energizes the electrimagnetic brake 321 mounted on the end of the shaft 311 at the side frame plate 278. The electromagnetic brake 321 stops rotation of the shaft 311 with the folding blade 49 in the up position and holds the shaft 311 against turning. The clutch 310 is de-energized until the next folded sheet arrives for folding.

When the clutch 310 is energized and clutches the gear 312 to drive the shaft 311 another gear 326 fixed on the shaft 311 drives an idler gear 327 mounted in a stub shaft 328 on the frame plate 289 to drive another idler gear 329 mounted on a stub shaft 330 on the plate 289 to in turn drive a gear 332 which, as best seen in FIG. 32, is mounted on a shaft 301 which drives the crank disk 300. Thus, it will be seen that the crank disk 300 and crank arm 296 drive the piston upwardly and downwardly with one revolution of the crank as permitted by the electromagnetic brake and clutch operating in conjunction with the flag 320 in the photo-sensing unit 321. This operation assures that the folding knife 49 will always be in the upper position and stopped for operation.

The drive for the folding knife 49 is from a motor drive unit shown in FIG. 34 which includes an electric drive motor 340 which drives a timing belt 341 mounted to drive a timing gear 342 mounted on a shaft 343 which is a drive shaft for the gear 315 which drives the gear 312 and the shaft 311 when the electromagnetic clutch 310 is energized. Also, mounted on the shaft 343 is a drive pulley 345 which drives a "V" belt 346 which drives a pulley 347 and another belt 348 to drive a pulley 349 which is connected to a drive shaft 350 extending across the frame plates 278 and 289. The shaft 350 drives a vertical belt 352 and which in turn drives another belt 353 and a final horizontal upper belt 355 which drives a pulley 356. As best seen in FIG. 35, the pulley 355 and shaft 356 drive gears 359, 360 which inturn drive a gear 361 connected to a lower conveyor belt drive drum 362. An upper gear 363 drives an upper conveyor belt drum 364 for the discharge conveyor means which will now be described.

After the outserts 12 having been discharged into the mouth 260 of the discharge conveyor belts 56 and 57 as above-described in connection with FIG. 26, the outserts 12 travel, as shown in FIG. 37, to the left to discharge into a box 22. The conveyor belts 56 include a first section 370 which changes the orientation of the vertically disposed outserts for horizontal travel along a path between facing runs 371 and 372 of the conveyor belt 56*a* and 57*a*. The belt 56*a* is mounted and driven by suitable drums 372 for the upper belt and suitable lower drums 373 support and drive the lower belt. The now leftward moving and horizontally disposed outsert 12 travels into a nip 375, as best seen in FIG. 37, between an upper conveyor belt 56*b* and a lower conveyor belt 57*b*. The belts 56*b* and 57*b* are driven by roller drums 377 and 378 which are connected to the gear drive as above-described in connection with FIG. 31. The belts 56*b* and 57*b* have facing horizontally disposed runs 380 and 381 which carry the outserts in a horizontal path to pairs of upper and lower discharge rollers 383, 383*a* and 384, 384*a* with the belt run 381 having an upward curved travel section about the lower smaller roller 383*a* to direct the outsert upwardly into a mouth 385 defined between the upwardly traveling belt sections. The upper roller is traveling about the surface of large upper roller 34 and a lower smaller roller 384*a* before moving upwardly at 56*v*.

Each of the outserts 14 is tightly held between the belt runs 380 and 381 as they approach the rollers 383, 383*a* and 384, 384*a* and the outserts are guided in an upward travel path and each outsert hits the preceding outsert which holds it against the upward traveling belt section 56*v* which frictionally engages the outsert and drives it upwardly to the stop means 59. However, the outserts are stopped in this upward movement by the vertical stop means 59 which preferably includes a movable stops 395 mounted on a horizontal support rod 396 of square cross section. Each stops 395 has a block-shape body 397 which is positioined and locked into place by set screws 398 threaded in the block box 397 with ends abutting the rod 396. Each successive outsert moving into the mouth 385 pushes the preceding outsert 14 to the left as viewed in FIG. 37 to slide the preceding outserts along a bottom wall 399 of the box 22. More specifically, as shown in FIG. 5, the box 22 is provided with three upstanding sidewalls 401, 402 and 403 and with an open top. The illustrated box has an end wall 405 (FIG. 37) which was originally vertically extended and parallel to the end wall 402 and which is connected to the lower bottom container wall 399 at a fold line.

The illustrated box is formed with end flaps and adhered to the outer side of the vertical end wall 402 by a suitable adhesive to complete the square corners for the box at the far end thereof. At the opposite near end of the box the flaps which are connected to the side wall 401, have been pulled from the now horizontal box end wall 405. These side flaps and are inserted intc hollow vertical slots in metal table walls of the discharge table 61. Likewise, the lower table wall is formed with a horizontal slot into which is pushed the now horizontal box end wall 405. Thus, the outserts may be pushed across the table plate 415 while on edge and into the mouth 60 of open box with the box being supported on the table 420 having legs 421, as best seen in FIG. 5. Usually, suitable weights in the form of slidable blocks will be positioned adjacent the discharge mouth 385 to hold the initial outcoming outserts 14 vertical until a long string of outserts is accumulated in the box after which the weights may be removed.

Also, in accordance with the present invention, there is provided, as best seen in FIG. 36, a counter jogger means 62 displaces the outserts laterally from their aligned positions on the belts 380 and 381 so as to be displaced within each row of outserts in the box 22. In the illustrated embodiment of the invention, the jogging and counting solenoid 62 has a solenoid construction similar to the solenoid 42 and to the solenoid shown in FIGS. 20-25 so that a detailed description thereof need not be given again. The side jogger solenoid has a plunger 62*a* with a head 62*b* projecting toward the belts to push the nearest outsert laterally across the conveyor belts 380 and 381. Each outsert pushes an adjacent outsert laterally across the various belts so that an outsert will be jogged in each column. Thus, in the box, the person can see and remove a predetermined count of outserts by looking at those outserts which have been slightly displaced in the column or row in which they are situated.

From the foregoing, it will be seen that there has been provided a new and improved method and apparatus for forming outserts from web rolls and for stacking automatically the outserts in a box. The apparatus quickly adjusts to handle various lengths of outserts and requires only one operator in contrast to the apparatus of the prior art, which required several operators.

Further, the apparatus is capable of high speed and reliable operation, for example, at rates of 10,500 sheets an hour which makes about 42,000 outserts per hour when the sheets are cut "4 up".

While a preferred embodiment has been shown and described, it will be understood that there is no intent to limit the invention by such disclosure but, rather, it is intended to cover all modifications and alternate constructions falling within the spirit and scope of the invention as defined in the appended claims.

FIG. 38 is a system block diagram of the outsert apparatus. The major functions of the apparatus are performed under the control of a system control 500 which communicates with the sheeting station 26, the folding station 33, the wrap around folding and adhesive station 40 and the discharge station 24 to produce the outserts 12 from sheet stock of roll 20. The system control 500 contains a programmable controller 502 (FIG. 41) which is microprocessor based and is adapted to execute a stored program that regulates the process of outsert manufacture precisely and accurately.

The programmable controller 502 utilized in the preferred implementation of the invention is a commercially available process controller, for example a model 510 programmer, made by the Texas Instruments Corporation of Dallas, Tex. The programmable controller 500 stores the system control program which is written in ladder logic instructions. The ladder logic is a representation of relay logic in software format such that control functions for different inputs and outputs can be implemented.

A block diagram of the programmable controller 502 is illustrated in FIG. 41. The programmable controller 502 includes a hand held programmer 505 through which instructions and data are entered to a processor 506 via a communications bus 508. The program information is stored in a ladder logic memory 510 and executed as a programmed process when the processor 506 is set into a run mode. The ladder logic memory can be used to store up to 256 ladder logic instructions which are used to implement the user system. The ladder logic instructions from the programmer are stored in the memory 210 under direction from a processor supervisory program. In general, the processor 506 scans the ladder logic memory 510 for the logic instructions and then applies the current input conditions according to the stored instructions to produce new outputs. The new outputs as they change with time control the specific hardware devices of the process. The timing for the execution of each cycle of the user program is more fully shown in FIG. 39.

The processor 506 communicates with and controls a series of image registers 512 to provide control for the outsert apparatus. The image registers comprise a series of input registers 514 which accept signals from a plurality of input field devices 516 and a series of output registers 518 which transmit control signals to a plurality of output field devices 518. A series of control relay registers 520 are used to store the status of the software control relays from the ladder logic program.

The programmable controller 502 also includes a power flow control (PF) 522 and a pushdown stack (PDS) 524. The PF 522 and PDS 524 are used by the processor 506 to help execute and to store the status of multiple user instructions during program execution. The status of each of these instructions is placed in the PF 522 as the processor fetches it from the ladder logic memory. If the instructions are a combination of logic (AND or OR) instructions, the processor accumulates the status of an entire instruction in the PF 522 before it is stored to the PDS 524.

The processor 506 regulated by the supervisor program runs the stored user program of the ladder logic memory when in a run mode. The supervisor times the operation of the programmable controller 506 such that a user program is scanned once every 16.67 ms for a loop execution (FIG. 39). At the start of each scan the state of the inputs 516 is loaded into the input image registers 514. After the input status is loaded, the processor 506 then executes one pass of the program instructions 526. At the end of the program loop execution, the outputs 518 are updated and transferred to the output terminals. Any time left over in the 16.67 ms cycle period is used as overhead 528.

The outputs 518 which the programmable controller regulates for the outsert apparatus provide control signals to the glue head solenoid 532, the kicker solenoid 536, the side guide solenoid 534, the clutch/brake solenoid 530, and the motor start relay 538. The inputs which the programmable controller 506 receives to determine the status of the process are logic signals from the material sense photocell 540, the brake/clutch photocell 542, the DC power on signal 544, the counter reset switch 546, and the single cycle switch 548.

FIG. 42 is a detailed timing diagram for the operational control of the outsert apparatus. The operation occurs substantially periodically to provide a positive and precise control of the mechanical means of the apparatus. In general, the process is a periodic control of the wrap around folding and adhesive station 40 which is initiated by sensing the presence of an outsert entering the station. The process is enabled by the start or DC power on signal 544 from the sheeting station indicating sheets stock is being fed. A sheet from the folding station 33 enters the wrap around folding and adhesive station 40 and is sensed by the material sense photocell 540. The leading edge causes the photocell impedance to change and this signal sets a monostable to output a pulse 550 indicating the start of a cycle. Because the photocell is in a known position relative to the forward stop 41 and it is known how long the sheet will take to be transported to the outsert folder, the distance corresponds to a predetermined timing period. This period is timed and then a pulse 252 is given to the pusher or side guide solenoid 150 to ensure that the material is up against the edge of the registration stop 43 of the outsert folder in station 40.

A known time after the registration by the side guide solenoid 150, another signal in the form of a pulse 254 is given in parallel to the glue head solenoids. The pulse 254 given to the glue head solenoids causes these mechanisms to reciprocate and touch the outserts which are now registered and up against the end stop so that the glue spots are precisely applied.

After the outsert has been properly positioned and adhesive applied, the folding knife 49 is applied making the outsert fold at 556 by feeding the roller 250 and 251. The finished outsert 12 enters the cutter rollers 255 and 256 and is thereafter discharged from the apparatus. The program maintains a counter of the pulses from the material sense photocell 540 and, at a set time indicating a predetermined number of outserts which have been boxed, provides a pulse 250 to the kicker solenoid 62 to move a finished outsert a small lateral distance. The lateral distance provides a visual indication of a group with a fixed number, for example 250.

The timing of the folding knife 49 is produced by controlling the operation of the electromagnetic clutch/brake 310/321 through each product cycle. The folding knife 49 has to be started from a particular set position to provide the outsert folding action at precisely the correct time. This is accomplished by resetting the folding knife positioning mechanism to a predetermined position after each fold and then initiating a folding cycle from that known position every cycle.

FIGS. 42F and 42G illustrate that the electromagnetic brake/clutch 321/310 signals are inversions of one another. The output of the clutch photocell signal is illustrated synchronously with these signals in FIG. 45H. The material sense timing pulse 550 initiates the cycle by releasing the brake 321 and setting the clutch 310. The folding knife mechanism begins to rotate, and because it is started from a predetermined position a set time prior to the outset reaching the forward stop position relative to the folding knife 49, the knife will arrive at the outsert fold precisely at the time desired. After the fold has been made the knife 49 retracts and the folding mechanism continues to rotate until it cycles to approximately the reset position. At this point, the clutch photocell generates a low status signal 560, indicating that the flag 320 is present and the reference position in the folder cycle is approaching. At the end of the clutch photocell signal 562, which is a rising edge or the end of flag 320, the brake 321 is reset to hold the folding knife 49 in the predetermined initial position.

Thus, the process is accurately and precisely controlled by providing a signal which indicates the material position with respect to the wrap around folding and adhesive station prior to the entry of the material into the area. A predetermined period of time after the material is sensed, it is registered with the side guide solenoid and then a predetermined period of time thereafter glued with the glue heads. During the time, beginning with the initial sensing of the material, the folding knife 49 is approaching the sheet and, at precisely the correct time, the knife edge reaches the material at a predetermined position in the folding area. A sharp, quick fold from the knife is made and the knife is immediately retracted. Thereafter, the folding knife 49 is reset to its predetermined initial position to await the next folding operation. Upon producing a set of number of outserts, the kicker solenoid is activated to produce a visual demarcation between groups of the outserts.

FIG. 40 illustrates a system flow chart for the control program which regulates the operation of the programmable controller 502. Initially, when the program is executed, a number of initial parameters and definitions are set up to define the ladder logic for the control program. Thereafter, a material sense and start routine A12 is executed to determine the inputs from the photocells and switches. After all inputs are read and analyzed, the program determines if the material sense photocell has started a timing cycle in block A14. If the material photocell is set, then a group of timers must be updated to determine if their output signals should be generated. This output timing and control function in block A16 sends signals to the output registers to indicate which of the particular solenoids and controls should be operated. Thereafter, in block A18, these control signals are output to the solenoids. If the material sense photocell has not started the cycle, then the program will loop through blocks A12, A14, and A18 until the start of another cycle is sensed. This basic program structure is executed at the scan rate of the supervisory program. In this manner the program totally controls the operation of the mechanical elements of the apparatus in a positive and precise manner.

In FIGS. 44A–46J there is illustrated a detailed flow chart of the operation of the control program. Beginning with the block A10 the first function of the program is to start the motor by energizing the motor relay. To accomplish this function in block A10 a delay timer for the motor is enabled. Thereafter, in blocks A11 and A13, respectively, tests are performed to determine whether the DC power is on and whether the timer delay is finished. Unless the DC power is on and the timer delay is finished, the program will not set the motor start latch in block A17. Further, if the DC power is not on, the motor start latch is reset in block A15.

Once this logic is executed, the motor start latch is interrogated in block A20 to determine if it is set. If this is the case and the DC power is on, as tested for in block A22, then the motor start relay is energized in block A24. Otherwise, the program will skip the step of energizing the motor start relay in block A24 until these conditions are met. These functions are illustrated in the ladder logic diagram of FIG. 47K where the motor delay timer is timer 9, the DC power is contact X11, and the motor start relay energize signal is output Y8.

The next function is to test whether the single cycle switch from the panel control is on. This is tested for in block A26. If on the signal sets the single cycle monostable in block A30. Thereafter, the single cycle switch is tested again in block A32 and if on the single cycle flag is set in block A34. Otherwise, the single cycle flag is reset in block A36. This produces an operation whereby the program on the next pass will reset the single cycle monostable. Because of this sequence, a pulse is generated every time the single cycle switch is operated in the system. FIG. 47K illustrates the ladder logic network implementing this function where contact X13 is the single cycle switch and C-48 is the single cycle monostable output and C-49 is the single cycle flag.

In a similar manner, blocks A38–A52 provide a pulse which is output upon sensing the start of the sheet or material. Generally, the material sense monostable is set in block A46 upon all of the following conditions being present. First, the material must be at a predetermined position as sensed by the photocell to pass the test of block A38. Next, the material sense flag must be reset in block A40. In addition to these two conditions, the motor start latch must be enabled in block A42 and the DC power must have been turned on in block A44. Otherwise, if any of these conditions is not present, then the monostable is reset in block A48. The process steps which accomplish the setting and resetting of the material sense flag are blocks A50, A51, and A52.

The material monostable output is used to set a material sense latch in blocks A54–A64. The latch is set on the output pule of the material monostable and then not to reset until the end of a cycle. In block A54, A60 and A62, the program determines whether the material sense monostable is set, the single cycle switch is set, or the material latch is set. If any of these conditions are true and the DC power is on, as tested for in block A56, then the material latch is set in block A58. Block A62 makes this operation a latch, and setting the latch will cause this condition to be true until the software latch is reset. Otherwise, in block A64, the material latch is reset before continuing.

The ladder logic implementing the material sense monostable and the material sense latch are shown in FIGS. 47M and 47L, respectively. The output of the material sense monostable is C21 and the output of the material sense latch is C23. The single cycle monostable is contact C48 and the material monostable is contact C21. The DC power is contact X11, the material start photocell is NX9, and the motor start latch is contact C47.

The next test is to determine whether the material latch is set in block A66, whereby the program determines whether to branch to the output section of the routine or whether to branch to the timer update section. If the material sense latch is set, then the program patch continues at block A66 at the beginning of the update timer section for executing the control functions of the program. Initially, a master delay timer is enabled in block A68 before testing whether a master timer reset has been generated in block A70. If the timer reset has been generated, then in block A72 the master delay timer is reset. Otherwise, the program continues through block A70 to block A74 where for each cycle, the program tests to determine if the master delay timer has produced a timeout. When the delay is over in block A76, the program will set the master delay timeout so that this information may be used by other parts in the program.

Thereafter, in blocks A78–A88, the program will set another timer termed the minimum delay timer. In block A78, the program determines whether the material latch is set. Assuming that it is the minimum delay timer will be enabled in block A80. Thus, the minimum delay timer and master delay timer are enabled approximately at the same time, i.e., within several instruction executions of each other. Next, the program checks for a master timer reset in block A82 and resets the minimum delay timer in block A84 if the signal is present. Otherwise, the program continues through the loop testing for a timeout in block A86 until such condition is found. When the minimum delay timer finally times out in block A88, the minimum delay timeout is set to record this fact.

Thereafter, in blocks A90–A94, both the minimum delay timeout and the master delay timeout are tested, and, if both conditions are present, then in block A94 the delay time over flag is set. Otherwise, the program continues by branching around this path. Both timeouts are necessary such that an error does not produce a delay timeout prior to the minimum delay timeout. This might occur, for example, if upon a operator entry a constant smaller than the minimum timeout is set for the master delay.

The functions are implemented in ladder logic in FIG. 47H where the master delay timer output is C24, the minimum delay timer output is C25, and the delay time output is C26.

The timing of the glue head function is next accomplished in blocks A96–A122. Blocks A96–A108 set up a glue head timer and blocks A110–A122 determine the conditions for the setting of a glue head flag such that the glue head solenoid may be energized during that time. In block A96 and A98, two conditions must be met before enabling the glue head timer in block A100. First, the delay timeout must be present and the side guide driver must be on. If both of these conditions are not present, then the program branches around block A100 and does not enable the glue head timer. Thereafter, the master timer reset is tested for in block A102 and the glue head timer reset in block A104 if the condition is found present. Otherwise, the program will continue through this path testing for a glue head timeout in block A106. When a timeout occurs, the glue head timeout is set in block A108 to record this condition.

The conditions for setting the glue head flag or resetting the glue head flag in blocks A120 and A122 are tested in blocks A110–A118 subsequent to determining the timeouts. In block A110, the program determines whether there has been a glue head timeout. If there has, then the glue head flag is reset in block A122. Otherwise, the program will continue at block A112 where the master delay timeout is tested for. If the master delay timeout is present, a coil default timeout is tested for in block A114. As long as no coil default timeout is present and the side guide is on as tested for in block A116, the program will continue the test of the conditions. The final condition tested for is whether the DC power is on in block A118. Thus, the glue head flag, indicating the time during which the glue head solenoid will be energized, begins with the end of the master delay and does not terminate until the end of the glue head timeout. The glue head, however, will only be energized if the DC power is on, the side guide is on, and there has been no coil default timeout.

Figure 45A:
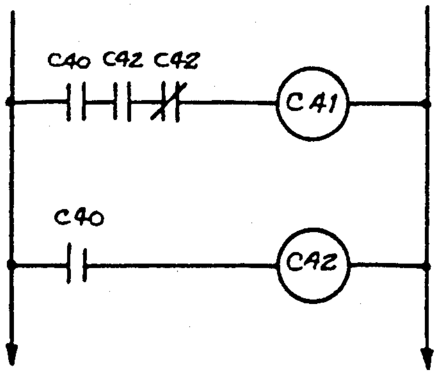
Figure 45B:
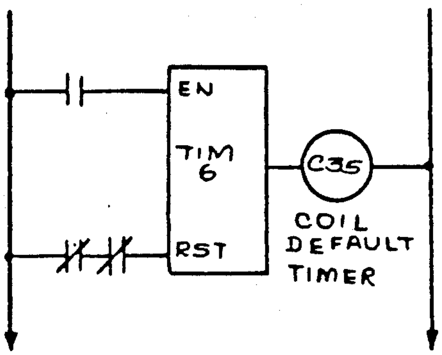
Figure 45C:
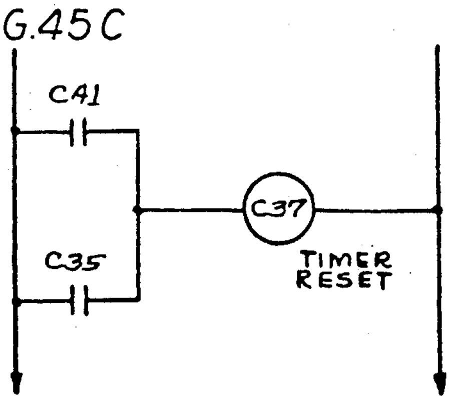
Figure 45D:
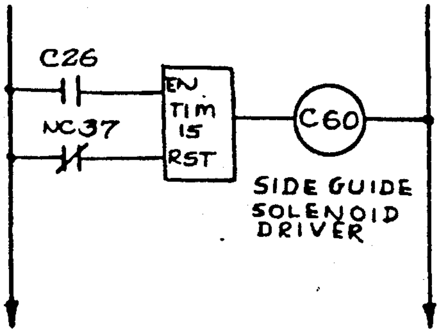
Figure 45E:
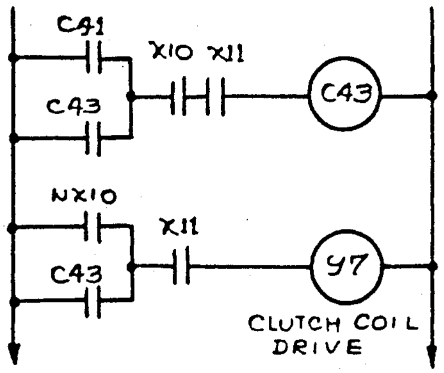
Figure 45F:
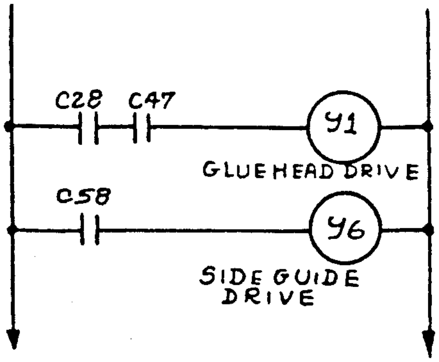
Figure 45G:
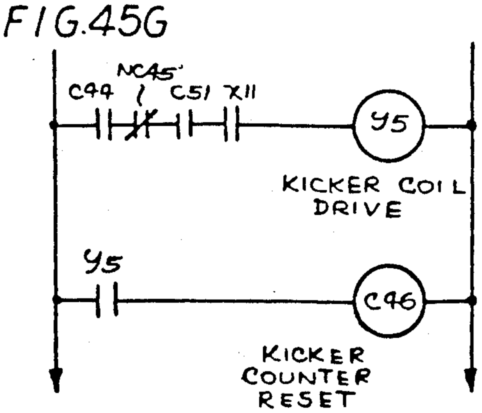
Figure 45H:
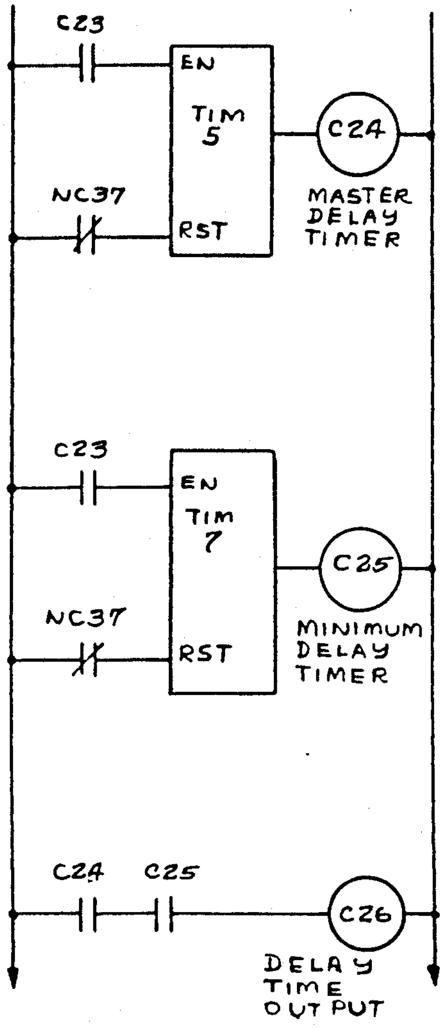
Figure 45I:
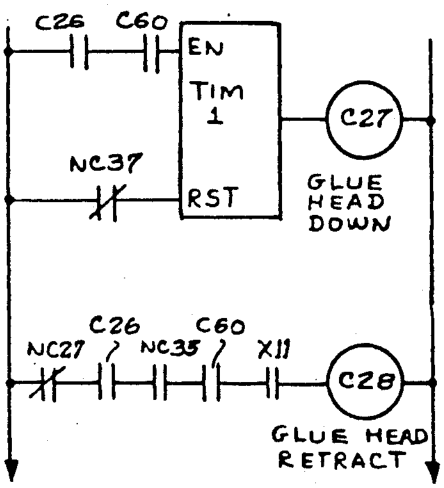
Figure 45J:
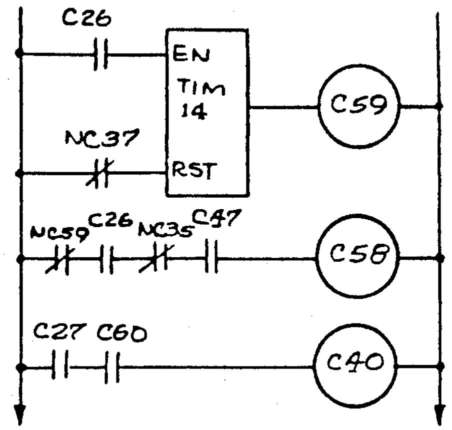
Figure 45K:
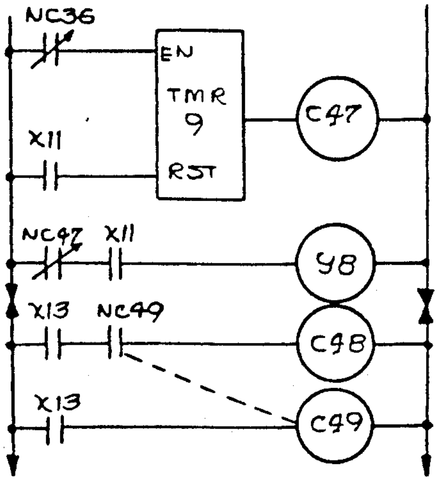
Figure 45L:
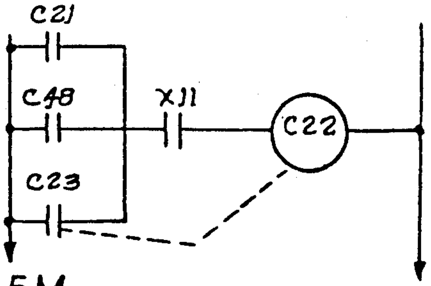
Figure 45M:
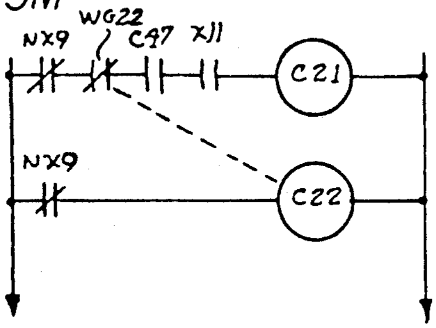

The glue head functions are shown implemented in FIG. 45F where the glue head on time is C27 and the glue head delay time is C28.

The next group of functional blocks describes the operation for setting or resetting the side guide flag. The side guide flag is used in the output section of the program to energize the side guide coil. Blocks A124–A134 comprise a side guide timer and blocks A136–A146 test the conditions necessary to determine the status of the side guide flag.

Initially, the routine tests for the master delay timeout in block A124 and, if present, the side guide timer is enabled in block A126. In block A128 a master time reset is tested for and the side guide timer reset in block A130, if present. Otherwise, the program will continue to execute block A132 until the side guide timer provides a timeout. When the timer finishes its timing function, a side guide timeout is set in block A134. Thereafter, in block A136, the side guide timeout is tested for and, if not yet present, conditions indicating the master delay timeout, coil default timeout, and motor start latch condition, are tested for in blocks A138, A140, and A142, respectively. If the the correct conditions are present, the side guide flag is set in block A144, or if any of the conditions are not met, the side guide flag is reset in block A146. Thus, the side guide solenoid is enabled at the end of the master delay timeout for an amount of time equivalent equal to the side guide timer duration. This, however, is only accomplished if the coil default timeout has not occurred and the motor start latch is set.

After both of these timers have been finished, the program continues at a sequence, blocks A148–A154, to set or reset a timer done flag. The timer done flag indicates whether or not all the timers of the sequence are done. Therefore, in block A148 the glue head timeout is tested for and in block A150 the side guide flag is tested. If the glue head timeout is present and the side guide flag is not on, then the timer done flag is set in block A152. Otherwise, the timer done flag is reset in block A154.

FIG. 455 implements the side guide functions in ladder logic where C59 is the side guide timer output and C58 is the side guide device.

Subsequently, a number of tests are accomplished in block A156–A170 to provide a done monostable which, when the time done flag is set, will cause a single pulse at that time. In block A156, the timer done flag is tested for in combination with the motor start latch in block A158. If both are present and the OS flag is not set in block A160, then the timer done monostable is set in block A162. Otherwise, failing any of these conditions will cause the timer done monostable to be reset in block A164. The OS flag is set or reset in accordance with the test done in block A166 which determines whether a timer done flag is present. Thereafter, the OS flag is either set in block A170 or reset in block A168, depending upon the state of the timer done flag in block A166. Thus, only one pulse is generated by the time done monostable in this sequence.

The next blocks A172–A190 provide logic for providing a coil default timer if any of the solenoids are energized too long. Further, the logic generates the master timer reset which allows the timers to be started at the next initial point of the software timing cycle. In block A172, the program determines whether the master delay time out is enabled or in block A174 determines if the timer done monostable has been set. Either one of these conditions indicates that at least one of the coils is on and to prevent burning out the coils if a default condition exists, the coil default timer is enabled in block A176. The program thereafter determines whether the master timer reset has been generated in block A178 and if such is the case, resets the coil default timer in block A180. A time out of the coil default timer is tested for in block A182 and if upon sequencing through the loop this condition is present, the coil default timeout is set in block A184. Normally the coil default timer will be reset by the master timer reset before it times out indicating a default condition.

If either the coil default time out is present in block A186 or the timer done monostable is set in block A188, then the master timer reset is generated in block A190. Thus, the coil default timer provides protection against the timer done monostable becoming inactive for too long a period of time. This operation protects the solenoids of the devices from being activated to long and perhaps damaging them. This protection is necessary because of the precision timing of the program and relatively large current draws the solenoids make so they act quickly and accurately.

The ladder logic of the timer done output is C40, the timer monostable is C41, and the timer OS output is C42, as illustrated in FIGS. 47J and 47A.

The program after these operations have been completed, begins the output stage of the sequence which actually drives the solenoids into operation. The first sequence of output section is for the clutch coil and occurs in blocks A192–A210. The sequence begins in block A192 by testing whether the timer done monostable is set or whether the clutch latch is set in block A194. If either of these conditions are present, then the program tests whether the brake/clutch photocell is presenting the low status. If the brake/clutch photocell is on and the DC power is on, as tested for in block A198, then the clutch latch is set in block A200. Otherwise, if these conditions are not present, tested in blocks A194, A196, and A198, the clutch latch is reset in block A202. Thus, at the correct time when the timer done monostable provides a pulse, the clutch latch is set to arm the clutch solenoid but does not operate until the brake/clutch photocell generates the correct status indication of the initial position of the folder knife.

Thereafter, in block A204, the status of the brake/-clutch photocell is tested once more and, if a signal is not present or the clutch latch is still set in block A206 and the DC power is on as tested for in block A208, then the clutch coil is energized in block A210. Otherwise, the program will branch around the energization sequence of the clutch coil and continue at block A212. Therefore, the clutch coil is energized while the clutch latch is on and until the brake/clutch photocell generates a reference signal indicating that the knife is prepositioned for the next cycle. At that point, the clutch coil is deenergized to await the next material sense signal and the beginning of a new cycle.

The next output sequence in blocks A212-A220 is provided to energize the glue head solenoid. If the glue head flag is present in block A212 indicating that the glue head solenoid should be energized and set in motion, then the program will check another condition in block A214. If the motor start latch is on in that test, then the glue head solenoid is energized in block A216. When either of these conditions become absent, the glue head solenoid is deenergized. Thus, this part of the program energizes the glue head solenoid for a set delay time at a particular reference point in the cycle. This produces a smooth and precise action for the glue head to reciprocate down onto the outsert folds at the correct position in the folder unit, pause, and then retract.

The next output sequence is for the side guide output as accomplished by blocks A218 and A220. The side guide flag is tested for in block A218 and is used to energize the side guide solenoid in block A220 when present. The solenoid is energized until the side guide flag is reset to provide a energization of the solenoid at a particular time in the sequence for a predetermined period.

The next blocks from A220 to A282 comprise the logic which controls the kicker solenoid to set a predetermined number of outsert folders a small distance away from the previous and subsequent groups. This is to provide a visual indication of a preset number of outserts. The software basically comprises a counter and two timers. The counter is used to count each outsert as folded and to produce a signal indicative of the predetermined number for a group. The first timer is to account for the delay from the end of the timing cycle of the gluing and folding operations to the outsert actually being discharged in the package. The second timer is to provide a set on time for the kicker solenoid such that positive operating is assured.

The implementation of these functions in ladder logic is illustrated in FIGS. 45E and 45F. The clutch latch output is C43, the clutch drive coil is Y7, the glue head drive is Y1, and the side guide drive is Y6.

In block A220 the end of the folding and gluing cycle is determined by testing whether the delay monostable is set. If the delay monostable is set, then the kicker counter is incremented in block A224. Next, a number of tests are executed to determine whether the kicker counter has reached its predetermined number or whether the manual counter reset switch has been operated. If either a count reset switch or a reset operation has occurred, as tested in blocks A226 and A228, then the counter is reset in block A229. Otherwise, the output of the counter is tested for in block A230 to determine if it is zero and the kicker counter zero gate is tested for in block A232 to determine if it is set. If both of these conditions are present, then the kicker flag is set in block A234. This will begin the arming of the kicker timer which times the last outsert from the folding process to the packaging process.

In block A236 the program checks whether the kicker output is set and, if such is the case, enables the kicker timer in block A238. If the kicker done flag is set in block A240, the kicker timer is reset in block A242. Otherwise, the timer is checked for a time out in block A244 and the kicker delay flag set in block A240 when the timer ends. The next sequence performs the enablement of the kicker solenoid on time and starts by testing whether the kicker delay flag is set in block A248. Such condition enables the kicker on timer in block A250 and causes the program to check for time out of the kicker on timer in block A256. When the time out occurs, the end kicker solenoid on time is set in block A258. The next pass through the program will produce an affirmative branch from block A252 to end the kicker on time by resetting the kicker on timer in block A254.

Several tests are used to energize the kicker solenoid in block A228 by checking for conditions previously set up by the program. In block A270, the program determines that the kicker counter has been incremented to the predetermined number, in block A272, the program determines that the kicker coil delay time has expired, in block A274, the program determines that the sequence is in the kicker coil on time; and, in block A276, the program determines that the DC power is on. Only if all of these conditions are present coincidently will the kicker solenoid be energized. The solenoid will be energized at a predetermined time for a set duration positively energizing the coil and producing the visual demarcation in the outserts. The next blocks 280 and 282 cause a reset of the kicker counter once the kicker solenoid is on. This provides an initialization for the counter to count the next group of outserts.

FIG. 45D illustrates a ladder logic implementation of this function where Y5 is the kicker coil drive output, and C46 is the kicker counter reset.

The final group of instructions in the program, blocks A284–A294 are provided to set or reset the side guide flag for output of the energization of the side guide solenoid. Initially, it is determined whether the material sense monostable has been set or the master timer reset has been generated in block A284 and A286, respectively. If either of the conditions is present, then the side guide timer is enabled in block A288. After the program determine there has been a time out in block A290 the side guide flag is set in block A294. Otherwise, the side guide flag is reset in block A292.

What is claimed is:

1. An apparatus for stacking folded sheets comprising:

upper and lower conveyor belt for conveying the folded sheets in a flat position along a first portion of a conveying run, said upper and lower conveyor belt traveling upwardly at a discharge end of the conveyor run to turn the folded sheet into an on-edge vertical position, said upper belt continuing upwardly at said discharge end to urge the on-edge folded sheet upwardly, stop means adjacent the upwardly traveling upper belt to abut the top edge of the folded sheet and to arrest its upward travel, and support means extending outwardly from the upwardly traveling upper belt to engage the lower edge of the folded sheet to support the folded sheet in an on-edge position in a column, each subsequent discharging on-edge folded sheet abutting the previously discharged and adjacent folded sheet a jogger means located adjacent said conveyor belts for engaging and jogging laterally outserts at a predetermined count of outserts, said laterally jogged outserts having a portion positioned laterally outwardly of the other outserts in a column to indicate a predetermined number of outserts in the the column.

2. An apparatus in accordance with claim 1 in which the jogger means comprises a solenoid having a plunger movable to jog said sheet.

3. An apparatus for stacking folded sheets traveling in parallel streams into parallel rows within a container, comprising:

upper and lower conveyor belts for conveying parallel streams of the folded sheets in a flat position along a first portion of a conveying run, said upper and lower conveyor belts traveling upwardly at a discharge end of the conveyor run to turn the folded sheets in each parallel stream into an on-edge vertical position, said upper belt continuing upwardly at said discharge end to urge the on-edge folded sheets in each parallel stream upwardly, stop means adjacent the upwardly traveling upper belt to abut the top edge of the folded sheets in each parallel stream and to arrest their upward travel, and support means extending substantially horizontally and outwardly from the outwardly traveling upper belt to engage the lower edge of the folded sheets to support the folded sheets in an on-edge vertical position in each of several parallel columns in the container, each subsequent discharging on-edge folded sheet abutting the previously discharged and adjacent folded sheet, and means on said support for holding the container in a substantially horizontal position with an open end facing the discharging columns of on-edge vertically disposed folded sheets, the container receiving the columns of folded sheets therein in parallel rows as each folded sheet pushes a previously stacked sheet in its row deeper into the container.

* * * * *

UNITED STATES PATENT AND TRADEMARK OFFICE

CERTIFICATE OF CORRECTION

PATENT NO. : 5,044,873

DATED : September 3, 1991

INVENTOR(S) : VIJUK, MICHAEL

It is certified that error appears in the above-identified patent and that said Letters Patent is hereby corrected as shown below:

On the title page, in item [76], correct the address of Inventor of record from "7 Tower Road, Oakbrook, Illinois 60512" to --2 North Tower Road, Oakbrook, Illinois 60521--.

Signed and Sealed this

Twenty-third Day of February, 1993

*Attest:*

STEPHEN G. KUNIN

*Attesting Officer*

*Acting Commissioner of Patents and Trademarks*